(12) United States Patent
Edlund et al.

(10) Patent No.: US 8,465,569 B2
(45) Date of Patent: Jun. 18, 2013

(54) MEMBRANE SUPPORT MODULE FOR PERMEATE SEPARATION IN A FUEL CELL

(75) Inventors: David Edlund, Hopkinton, MA (US); Paul Osenar, Westford, MA (US); Nathan Palumbo, West Boylston, MA (US); Ronald Rezac, Bolton, MA (US); Matt Steinbroner, Grafton, MA (US)

(73) Assignee: Protonex Technology Corporation, Southborough, MA (US)

( * ) Notice: Subject to any disclaimer, the term of this patent is extended or adjusted under 35 U.S.C. 154(b) by 1224 days.

(21) Appl. No.: 12/283,807

(22) Filed: Sep. 16, 2008

(65) Prior Publication Data

US 2010/0064887 A1  Mar. 18, 2010

(51) Int. Cl.
*B01D 53/22* (2006.01)
(52) U.S. Cl.
USPC ............... 95/11; 96/7; 96/4; 95/55; 95/45; 95/56; 95/43; 210/321.6; 210/321.84
(58) Field of Classification Search
None
See application file for complete search history.

(56) References Cited

U.S. PATENT DOCUMENTS

| | | | |
|---|---|---|---|
| 3,415,038 A | 12/1968 | Merten et al. | |
| 4,263,017 A | 4/1981 | Karn | |
| 5,498,278 A * | 3/1996 | Edlund | 96/11 |
| 5,645,626 A * | 7/1997 | Edlund et al. | 95/56 |
| 5,654,109 A | 8/1997 | Plowman et al. | |
| 5,997,594 A * | 12/1999 | Edlund et al. | 48/76 |
| 6,183,542 B1 | 2/2001 | Bossard | |
| 6,319,306 B1 * | 11/2001 | Edlund et al. | 96/7 |
| 6,332,913 B1 | 12/2001 | Breitschwerdt et al. | |
| 6,572,683 B2 | 6/2003 | Yoshida et al. | |
| 6,602,325 B1 * | 8/2003 | Frost et al. | 95/56 |
| 6,632,270 B2 | 10/2003 | Edlund et al. | |
| 6,660,069 B2 | 12/2003 | Sato et al. | |
| 6,761,755 B2 | 7/2004 | Jantsch et al. | |
| 6,835,232 B2 * | 12/2004 | Frost et al. | 95/56 |
| 6,946,020 B2 | 9/2005 | Han et al. | |
| 7,001,446 B2 | 2/2006 | Roark et al. | |
| 7,033,641 B2 | 4/2006 | Saijo et al. | |
| 7,056,369 B2 | 6/2006 | Beisswenger et al. | |
| 7,144,444 B2 | 12/2006 | Takatani et al. | |
| 7,265,057 B2 | 9/2007 | Liu | |
| 7,306,744 B2 | 12/2007 | Matsuo et al. | |
| 7,387,740 B2 | 6/2008 | Lai et al. | |
| 8,110,022 B2 * | 2/2012 | DeVries | 95/56 |
| 2010/0068132 A1 * | 3/2010 | Vencill et al. | 423/648.1 |
| 2011/0232491 A1 * | 9/2011 | Pledger et al. | 96/9 |

* cited by examiner

*Primary Examiner* — Duane Smith
*Assistant Examiner* — Pankti Patel
(74) *Attorney, Agent, or Firm* — Edwards Wildman Palmer LLP; Christine C. O'Day; George N. Chaclas

(57) ABSTRACT

A gas separation unit 102, 200, 300 for permeating a gas out from a pressurized feed mixture includes an input manifold 104, 204, an exhaust manifold, 106, 206 and a permeate assembly 108, 208, 303. The permeate assembly supports one or more permselective foils 130, 132, 218, 232, 318 over a hollow cavity 134, 272, 306 supported by a microscreen element 142, 144, 228, 230, 326. The microscreen element includes non-porous perimeter walls 190, 192, 278 supported on a frame surface and a porous central area 194, 280 supported over the hollow cavity. A porous spacer 138, 140, 174, 234 disposed inside the hollow cavity structurally supports the entire microscreen surface spanning the hollow cavity while also providing a void volume for receiving fluid passing through the porous central area and for conveying the fluid through the hollow cavity.

24 Claims, 14 Drawing Sheets

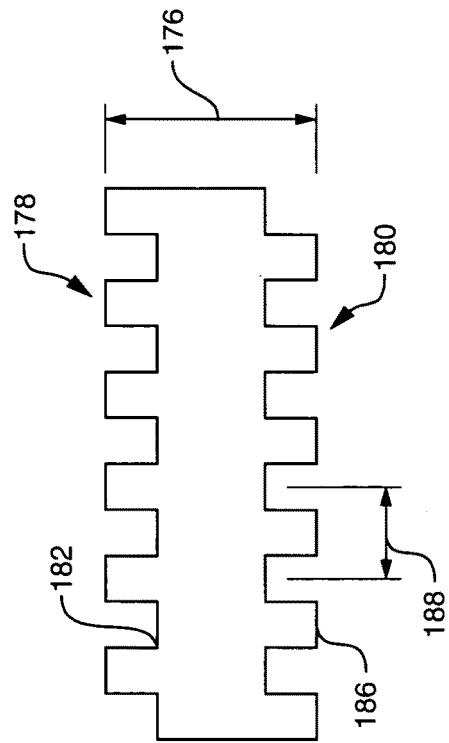
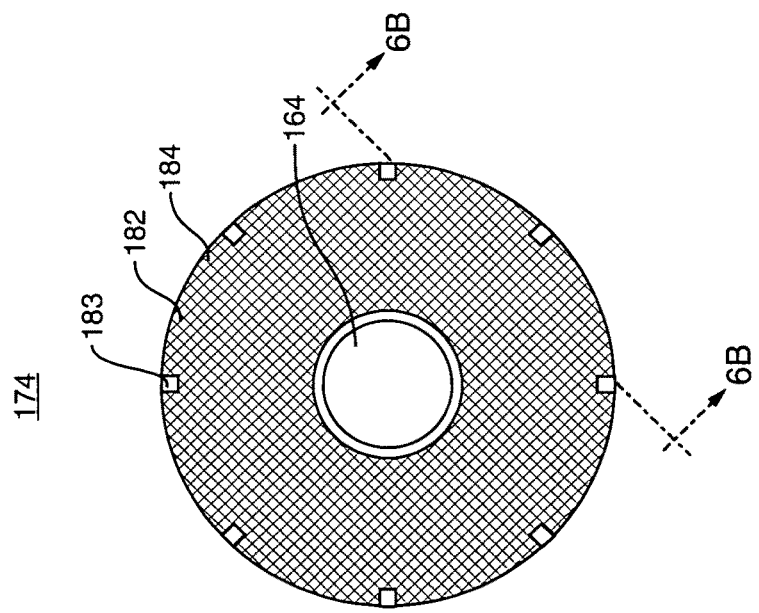
FIG. 6B
FIG. 6A

MEMBRANE SUPPORT MODULE FOR PERMEATE SEPARATION IN A FUEL CELL

BACKGROUND OF THE INVENTION

The subject technology relates to a method and apparatus for supporting a membrane for gas separation for use with a fuel cell and like devices. More specifically, a metal foil permselective membrane is supported over an open cavity by a planar microscreen element that includes a thin metal sheet form with a non-porous perimeter wall surrounding a perforated or porous central area that is sized to match the dimensions of the open cavity.

Fuel cells are electrochemical devices that produce direct current (DC) electricity by the reaction of a fuel with an oxidant, typically producing byproducts of heat and water. Common fuels are hydrogen, methanol, and carbon monoxide. The most common oxidant is oxygen, either in a relatively pure form or from ambient air. Fuel cells contain an anode, a cathode, and an electrolyte barrier between the anode and cathode. The fuel is introduced at the anode and the oxidant is introduced at the cathode. The electrolyte barrier, commonly referred to as a membrane-electrode assembly or MEA, is an ionically conductive thin barrier that is relatively impermeable to the fuel and oxidant, and is electrically insulating. Known fuel cell designs and operating principles are described in, for example, The Fuel Cell Handbook, 7th Edition (2004) published by the US Department of Energy, EG&G Technical Services under contract DE-AM26-99FT40575.

Various techniques are known for separating gases for use in chemical reactions in fuel cells and like devices requiring similar fuel. As known in the art, the physical and/or chemical properties of gases to be separated are exploited to separate them from a mixture of gases. Various methods such as adsorption, absorption, cryogenic distillation, permeation and the like can be used for separation of gases. For example, hydrogen can be separated from a gaseous mixture using a membrane/foil composed of palladium-copper alloys or palladium-silver alloys owing to the chemical property of hydrogen that makes it permeable through palladium-copper and palladium-silver alloys.

In the case of separation through permeation, membranes are used for separation of a gas from a mixture of gases. A gas can be separated by permeation because of selective permeability of the gas through the membrane based on the solution-diffusion mechanism. As the gas passes through the membrane, because of a pressure gradient on either side of the membrane, a difference in concentration of the gas between the two sides of the membrane is created. As a result, there is a net diffusion of the gas through the membrane from the high-pressure side to the low-pressure side.

Usually, the pressure gradient on either side of the membrane is at least 50 psi and often between 100 psi to 200 psi during operation. The membrane is also thin, sometimes very thin (e.g., from 0.003 inches thick to 0.0005 inches thick), since the flow of permeating gas through the membrane is inversely proportional to the membrane thickness. Thus, it is desirable to use a thin membrane to increase the permeate gas flow rate through the permselective membrane and to reduce membrane material volume in applications where the membrane material is costly, e.g., when the membrane comprises precious metals.

Generally the membrane is supported over one or more open cavities or passages so that permeate gas passing through the membrane has an unrestricted flow path. Heretofore, undesirably thick membranes were used to prevent the membrane from being deformed or punctured by pressure forces tending to force the membrane into the open cavities or passages. Additionally, gaps and/or discontinuities are often formed by the support structure so that the membrane deforms into these discontinuities and locations of stress are created. Such deformation of the membranes under pressure often causes rupture leading to failure. There have been many attempts to overcome these difficulties.

For example, U.S. Pat. No. 6,319,306 to Edlund et al. discloses a coarse mesh 74 for providing parallel flow conduits in FIG. 7. The coarse mesh 74 is sandwiched between fine screen members 76 to form a screen assembly 70. The fine screen members 76 minimize apertures and projections that may damage the membranes 46. The screen assembly 70 is placed in a frame 90 that has a central opening to make a permeate frame 91. The permeate frame 91 is covered with a gasket 92 that also has a corresponding central opening. The membrane 46 is overlaid onto the gasket 92 such that the membrane 46 deforms into the gasket opening to rest against the adjacent fine screen 76. Strain occurs where the membrane 46 transitions across the lip of the gasket's central opening. Such strain causes fatigue and rupture as noted above.

Additional patents yield similar drawbacks and/or complexity such as U.S. Pat. No. 7,033,641 to Saijo et al., U.S. Pat. No. 6,946,020 to Han et al.; U.S. Pat. No. 6,835,232 to Frost et al., U.S. Pat. No. 7,056,369 to Beisswenger et al. and U.S. Pat. No. 7,144,444 to Takatani et al.

SUMMARY OF THE INVENTION

In view of the above, improved structures for supporting thin permselective membranes during high pressure operations are desirable. Desirable support structures are able to prevent rupture of the membrane during permeation and facilitate efficient collection of the permeated gas by utilizing as much of the membrane area for gas flow as is possible.

It is an object of the subject technology to support a foil membrane over an opening in a manner that prevents membrane damage and improves reliability and extends the life of the foil membrane.

It is a further object of the subject technology to utilize thinner permselective membranes in gas separation devices to thereby increase permeate flow rates across the membrane and to reduce the amount of permselective membrane material.

It is a further object of the subject technology to support a foil membrane over an opening using only a compression force to secure the foil membrane in place.

The subject technology overcomes the problems cited in the prior art by providing a separation unit for separating a permeate out from a pressurized mixture. The pressurized mixture may comprise a mixture of one or more gases, liquids and or vapors that include a permeate to be separated out therefrom. The permeate may comprise a gas or a liquid. In particular, the permeate may comprise hydrogen gas and the foil membrane may comprise a palladium alloy such as palladium-copper, palladium-silver or palladium-gold which separates hydrogen from the pressurized mixture by a solution-diffusion mechanism.

The separation unit may include a permeate frame or a permeate assembly configured with one or more continuous perimeter walls or other structure configured to entirely surrounding or otherwise enclose a main through aperture or other open area defining a hollow cavity or any other opening area of the permeate frame. The perimeter walls at least include a top surface for supporting a first microscreen element over the hollow cavity and may include a parallel and opposing bottom surface for supporting a second microscreen element over the hollow cavity opposed to the first microscreen element.

Each microscreen element comprises a thin material layer having substantially parallel and opposing planar top and bottom surfaces. Each microscreen element is formed with one or more substantially continuous non-porous perimeter walls and with a perforated or porous central area disposed between the non-porous perimeter walls. The non-porous perimeter walls are disposed in mating contact with top or bottom surfaces of the permeate frame or permeate frame structure formed to surround the hollow cavity and the perforated or porous central areas are disposed to extend over at least a portion of the hollow cavity and preferably over the entire hollow cavity.

The porous central area is configured with a plurality of through apertures that pass through the microscreen material layer. The through apertures are at least large enough to allow permeate to flow through each through aperture. Ideally, the combined area of the through apertures ranges from about 80 to 99% of the total area of the perforated or porous central area of the microscreen element.

A first thin foil permselective membrane is disposed in mating contact with the first microscreen element opposed to the top surface of the permeate frame and exposed to the pressurized feed mixture to allow a permeate to be separated from the feed mixture by passing through the first permselective membrane and the porous central area of the first microscreen into the hollow cavity. A second thin foil permselective membrane may be disposed in mating contact with a second microscreen element opposed to the bottom surface of the permeate frame and exposed to the pressurized feed mixture to allow additional permeate to be separated from the feed mixture by passing through the second permselective membrane and the porous central area of the second microscreen into the hollow cavity Ideally each of the first and second membranes is substantially identical and is disposed over the entire perforated or porous central area of the microscreen elements. Preferably, the permselective membranes and the microscreens elements are secured in place by a compression force, although other means known in the art (such as brazing, diffusion bonding, welding, and gluing) may be used.

The separation unit includes one or more porous spacers disposed within the hollow cavity. The porous spacers include a top spacer surface supported in mating contact with the first microscreen element to structurally support the first microscreen element as it spans the hollow cavity. The spacers prevent the first microscreen element from being deflected into the hollow cavity by pressure forces generated by the pressurized feed mixture. The porous spacers are further configured with a first void volume in fluid communication with substantially all of the porous central area of the first microscreen to allow permeate to flow through the void volume.

In embodiments that utilize a second microscreen element, the porous spacer includes a bottom surface in mating contact with the second microscreen element to structurally support the second microscreen element as it spans the hollow cavity. This prevents the second microscreen element from being deflected into the hollow cavity by pressure forces generated by the pressurized feed mixture. The porous spacers are further configured with a second void volume in fluid communication with substantially all of the porous central area of the second microscreen to allow permeate to flow through the second void volume. In some configurations the first and second void volumes are fluidly connected.

The separation unit may be configured to include a first chamber for receiving and containing the pressurized feed mixture therein. The first chamber is separated from the hollow cavity by a first membrane assembly formed by the first permselective membrane and the first microscreen element with the first permselective membrane facing the first chamber.

The separation unit may include a second chamber for receiving the pressurized mixture from the first chamber. The second chamber is separated from the hollow cavity by a second membrane assembly formed by the second permselective membrane and the second microscreen element with the second permselective membrane facing the second chamber.

The subject technology further overcomes the problems cited in the prior art by providing a method for separating a permeate from a pressurized feed mixture by supporting a first microscreen element to span a hollow cavity, supporting a first permselective membrane on the first microscreen element outside the hollow cavity and supporting the first microscreen element on a porous spacer disposed inside the hollow cavity. The method also includes supporting a second microscreen element to span the hollow cavity opposed to the first microscreen element, supporting a second permselective membrane on the second microscreen element outside the hollow cavity and supporting the second microscreen element on the porous spacer disposed inside the hollow cavity.

In another embodiment, the subject technology is directed to a permeate assembly for separating a permeate gas from a pressurized feed mixture. The permeate assembly includes a support frame having a frame perimeter that defines a central aperture, a porous spacer in the central aperture, a microscreen element having a first surface compressed against the support frame and the porous spacer and a second planar surface opposing the first surface, the microscreen element having a non-porous perimeter in mating contact with the frame perimeter and defining a plurality of transverse passages from the second surface to the first surface, the transverse passages being in fluid communication with the porous spacer, and a permselective membrane compressed against the second planar surface of the microscreen element. When the pressurized feed mixture is urged against the permselective membrane, permeate gas is forced to pass through the permselective membrane and the planar microscreen element into the porous spacer. As a result, the permselective membrane is protected from any discontinuity between the edge of the porous spacer and support frame. Preferably, the transverse passages are formed by a semiconductor manufacturing process such as, without limitation, laser etching, photolithographic patterning with chemical etching, and plasma etching.

BRIEF DESCRIPTION OF THE DRAWINGS

The features of the subject technology will best be understood from a detailed description of the invention and a preferred embodiment thereof selected for the purposes of illustration and shown in the accompanying drawings in which:

FIG. 6A illustrates a top view of modified porous spacer in accordance with an alternate configuration of the first embodiment of the subject technology;

FIG. 6B illustrates a section view of the modified shim in accordance with an alternate configuration of the first embodiment of the subject technology;

Figure 1:
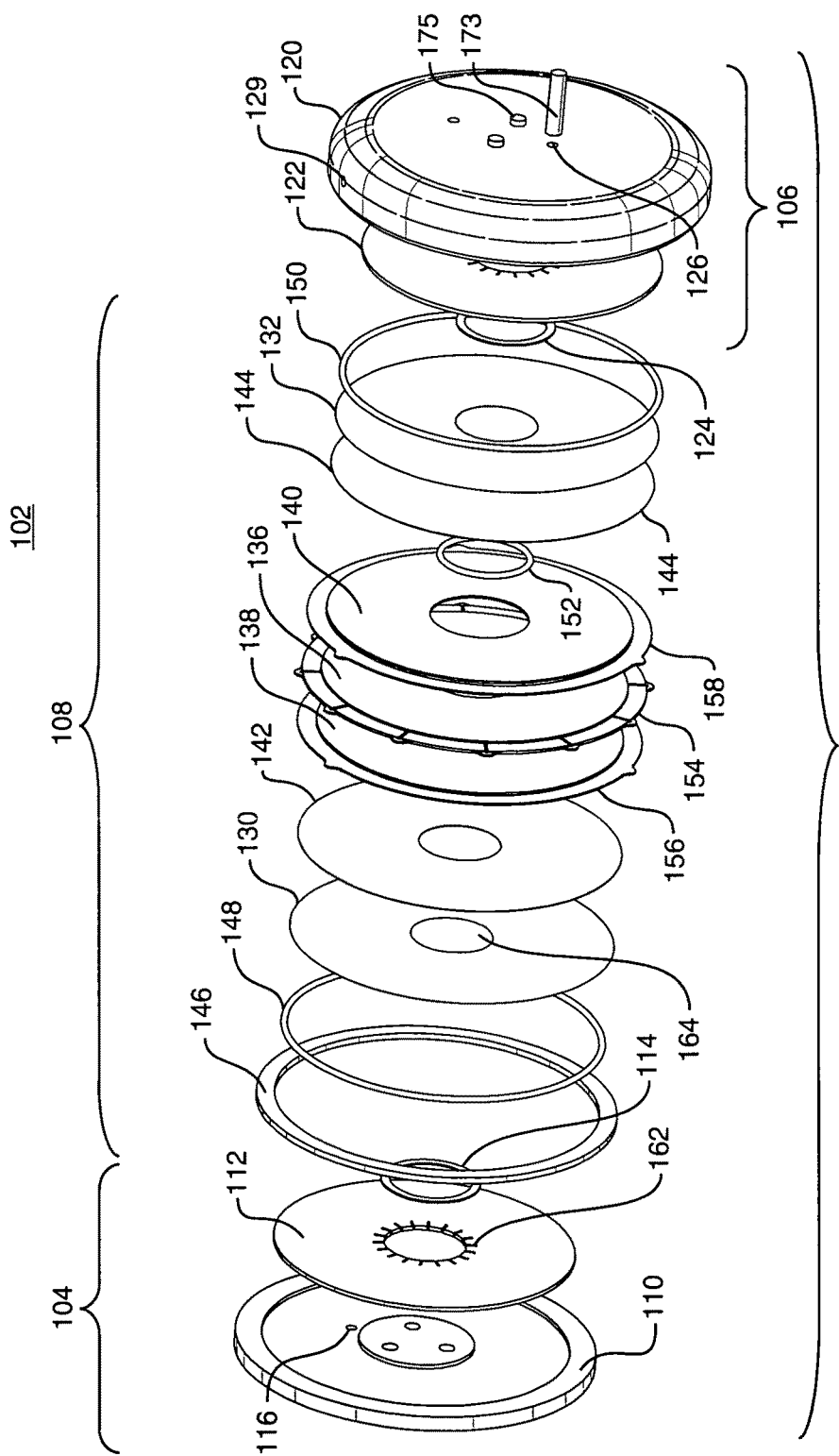
FIG. 1 illustrates an exploded view of a gas separation unit in accordance with a first embodiment of the subject technology.

Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the subject technology.

DESCRIPTION OF THE PREFERRED EMBODIMENTS

While the specification concludes with the claims defining the features of the invention that are regarded as novel, it is believed that the invention will be better understood from a consideration of the following description in conjunction with the figures, in which like reference numerals are carried forward.

As required, detailed embodiments of the subject technology are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the subject technology in virtually any appropriately detailed structure. Further, the terms and phrases used herein are not intended to be limiting but rather to provide an understandable description of the invention.

The terms "a" or "an", as used herein, are defined as one or as more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

Referring to FIGS. 1-8, a first embodiment of a gas separation unit 102 in according to the subject technology includes an input manifold 104 for receiving a gaseous mixture into the gas separation unit through an input port 116, an output manifold 106 for exhausting any remaining gaseous mixture out of the gas separation unit through an output port 126 and a permeate assembly 108 disposed between the input manifold 104 and the exhaust manifold 106 for separating permeate gas out from the gaseous feed mixture and for exhausting the permeate gas separated out there from out of the gas separation unit through a permeate output port 129. The gas separation unit 102 has a circular cross-section centered by a central axis 105 and has a transverse thickness 107.

Figure 2:
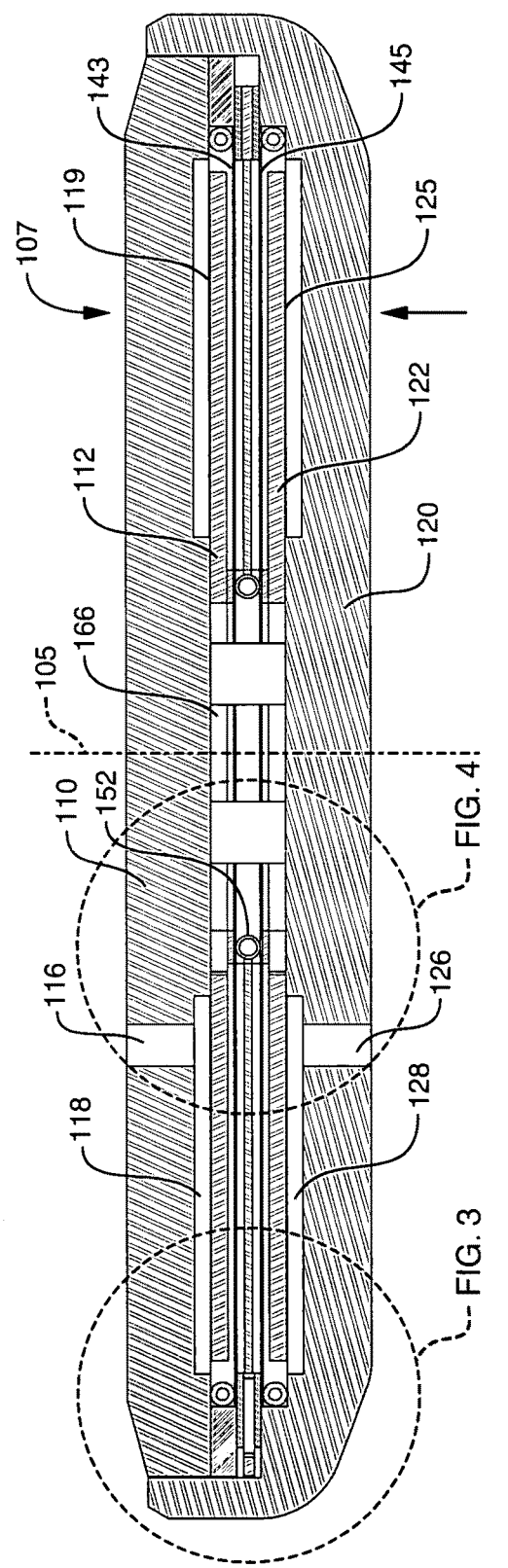
FIG. 2 illustrates a cross-sectional view of a gas separation unit in accordance with the first embodiment of the subject technology.
Figure 3:
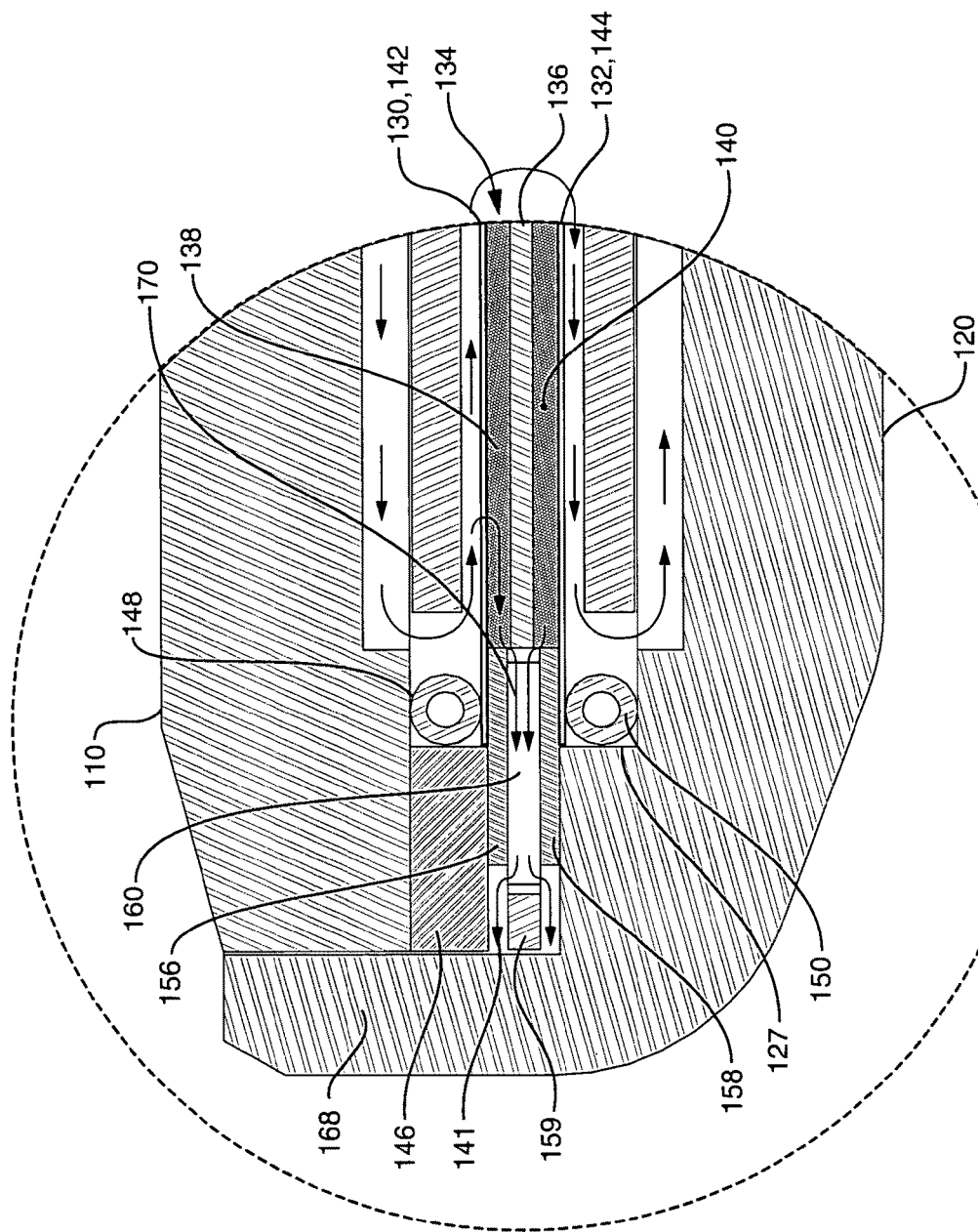
FIG. 3 illustrates a magnified cross-sectional view of a peripheral edge of a gas separation unit in accordance with the first embodiment of the subject technology.

Referring now to FIGS. 2 and 3, the input manifold 104 receives the gaseous feed mixture through the intake port 116 and delivers the gaseous mixture into a first chamber 118. The first chamber 118 includes a first portion disposed between an internal surface of the end plate 110 and a first surface 119 of an input feed distribution plate 112. The first chamber 118 includes a second portion disposed between the input feed distribution plate 112 and a first permselective membrane 130. Both the first and second portions of the first chamber 118 define an annular volume having an outside diameter approximately defined by a first outer o-ring 148 and an inside diameter approximately defined by a first inner backup ring 114. In addition, the first chamber 118 is pressure sealed at its outside diameter by the first outer o-ring 148.

Upon entering the first chamber 118, the gaseous feed mixture is at an elevated pressure and therefore substantially fills the first chamber 118 at a substantially uniform pressure. The gaseous mixture entering through the input port 116 flows radially outward from the input port 116 to fill the annular volume of the first portion of the first chamber 118 and then flows around the input feed distribution plate 112 to fill the annular volume of the second portion of the first chamber 118. Since the second portion of the first chamber 118 is exposed to the first permselective membrane 130, a permeate gas included in the gaseous feed mixture, begins to permeate through the first permselective membrane 130. As is well known, the rate of diffusion through the first permselective membrane 130 is proportional to the pressure gradient across the membrane, as well as the gas and membrane temperature; and is inversely proportional to the membrane thickness.

A second chamber 128 is formed by the output manifold 106 and the second chamber 128 is in fluid communication with the first chamber 118. In particular, the second chamber 128 includes a first portion formed between an internal surface of the end plate 120 and a first surface 125 of an output feed distribution plate 122. The second chamber 128 also includes a second portion formed between the output feed distribution plate 122 and a second permselective membrane 132. Both the first and second portions of the second chamber 128 define an annular volume with an outside diameter approximately defined by a second outer o-ring 150 and an inside diameter approximately defined by a second inner backup ring 124. In addition, the second chamber 128 is pressure sealed by the second outer o-ring 150.

Referring to FIGS. 1-3, the gas separation module 102 includes a permeate assembly 108 for supporting each of the first and second permselective membranes 130, 132 over a hollow cavity 134 and for collecting permeate gas that passes from the first and second chambers 118 and 128 into the hollow cavity 134 through each permselective membrane 130, 132. In addition, the permeate assembly is configured to deliver the permeate gas collected in the hollow cavity 134 out of the gas separation module 102 through a permeate output port 129. According to a particularly advantageous feature of the subject technology, the first permselective membrane 130 is supported in mating contact with a first microscreen element 142, which spans the hollow cavity 134, and the second permselective membrane is supported in mating contact with a second microscreen element 144, which also spans the hollow cavity 134. As best viewed in FIGS. 1-3, the mating first permselective membrane 130 and first microscreen element 142 form a first membrane assembly 143 disposed with the first permselective membrane 130 facing the first chamber 118 and with the first microscreen element 142 facing the hollow cavity 134. Similarly, the mating second permselective membrane 132 and second microscreen 144 form a second membrane assembly 145 disposed with the second permselective membrane 132 facing the second chamber 128 and the with the second microscreen element facing the hollow cavity 134. Each of the first and second permselective membranes 130 and 132 as well as each of the first and second microscreen elements 142 and 144 have a substantially identical annular shape with an outside diameter formed by a substantially common circumferential edge of the permselective membranes and microscreens, and an inside diameter formed by a substantially common center aperture 164 formed through each permselective membrane and micro screen.

Referring to FIGS. 1-5 and 7 and the support of the outer peripheral edges of the first and second membrane assemblies 143 and 145, the permeate assembly 108 includes a permeate distribution ring 154 which is disposed between the first membrane assembly 143 and the second membrane assembly 145. The permeate distribution ring 154 is an annular ring having an outside diameter, an inside diameter, a ring width 155 and a ring thickness 157. The permeate distribution ring 154 also includes and a plurality of permeate flow slots 160 which are evenly disposed around its circumference and which each passes through the ring thickness 157. The flow slots 160 have a length starting from the permeate distribution ring inside diameter and extending substantially through the ring width 155. Accordingly, the ring 154 is formed with arched material features 159 proximate to each flow slot 160 for reinforcing the structural integrity of the ring where the ring width 155 is reduce by the flow slots 160.

Figure 5:
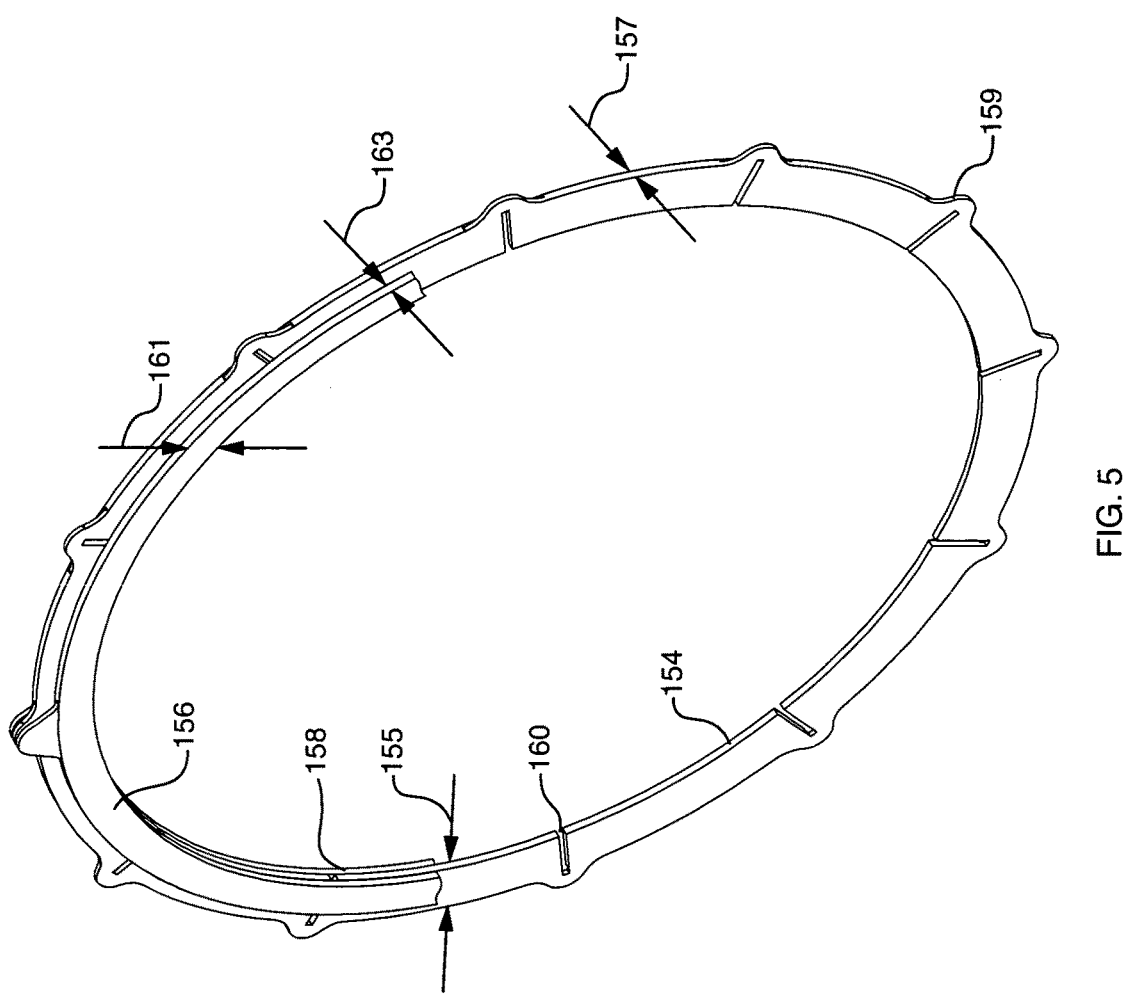
FIG. 5 illustrates an isometric view of a permeate distribution ring and cut away views of opposing top and bottom outer back up rings in accordance with the first embodiment of the subject technology.

The permeate assembly 108 further includes a pair of substantially identical outer backup rings, with a top back up ring 156 and a bottom backup ring 158, each comprising an annular ring having an outside diameter, an inside diameter, a ring width 161 and a ring thickness 163. The outer backup rings 156 and 158 are positioned in mating contact with opposing faces of the permeate distribution ring 154. The inside diameter of each of the outer back up rings 156 and 158 is substantially equal to the inside diameter of the permeate distribution ring 154. The outside diameter of the outer back up rings 156 and 158 is less than the outside diameter of the permeate distribution ring 154 such that when the three rings 154, 156 and 158 are in mating contact with each other, a portion of the length of each flow slots 160 is exposed as shown in FIG. 5 to allow permeate gas to flow through the flow slots 160.

Referring to FIG. 3, which is an expanded section view taken through one of the flow slots 160, a peripheral edge of the first membrane assembly 143 is supported in mating contact with the top backup ring 156 and a peripheral edge of the second membrane assembly 145 is supported in mating contact with the bottom backup ring 158. In both cases, the microscreen elements 142 and 144 are in mating contact with a corresponding back up ring 156, 158. The outside diameter of each first and second membrane assembly 143 and 145 is formed larger than the inside diameter of each backup ring 156 and 158 and smaller than the outside diameter of each backup ring 156 and 158 to ensure that contact is made between the peripheral circumferential edges of the first and second membrane assemblies 143 and 145 and a corresponding back up ring 156 and 158. Preferably the outside diameter of each first and second membrane assemblies 143 and 145 is sized to overlap with about one half of the backup ring width 161.

The first outer o-ring 148 is sized to contact the first membrane assembly 143 in the region where the first membrane assembly overlaps and makes contact with the top back up ring 156 and the second outer o-ring 150 is sized to contact the second membrane assembly 145 in the region where the second membrane assembly overlaps and makes contact with the bottom back up ring 158. Preferably the position where the first and second outer o-rings contact the first and second membrane assemblies 143, 145 is approximately centered with respect to the overlapping contact region of the first and second membrane assemblies 143, 145 with the back up rings 156, 158. Each of the first and second o-rings 148 and 150 also contacts a corresponding surface of an end plate 110, 120 at surfaces of each o-ring that are opposed the first and second membrane assemblies 143, 145 such that when the gas separation unit is assembled, the o-rings 148 and 150 are compressed by a surface of a corresponding end plate 110, 120 and a compression force generated thereby clamps the first and second membrane assemblies 143, 145 in position while also pressure sealing the peripheral edge of the first and second cavities 118, 120, as well as pressure sealing the peripheral edges of the first and second membrane assemblies 143, 145 against the backup rings 156 and 158.

The permeate assembly 108 further includes the spacer ring 146. The spacer ring 146 is an annular element with an outside diameter, an inside diameter, a ring width and a ring thickness. The inside diameter of the spacer ring 146 is sized to back up the first outer o-ring 148 to minimize any radial expansion thereof. The outside diameter of the spacer ring 146 mates with an inside diameter of a peripheral wall 168 that extends substantially vertically up from the end plate 120.

The spacer ring 146 is disposed between the top backup ring 156 and an internal surface of the end plate 110 and the thickness of the spacer ring 146 is selected to apply a compression force against the top outer backup ring 156 to clamp the top and bottom backup rings 156 and 158 snugly against the peripheral distribution ring 154 as well as to pressure seal contacting areas between the mating parts thereby sealing an outer peripheral edge of the hollow cavity 134 forcing permeate gas to flow from hollow cavity 134 through the permeate flow slots 160 to a peripheral flow channel 141 that leads to the permeate output port 129.

Figure 4:
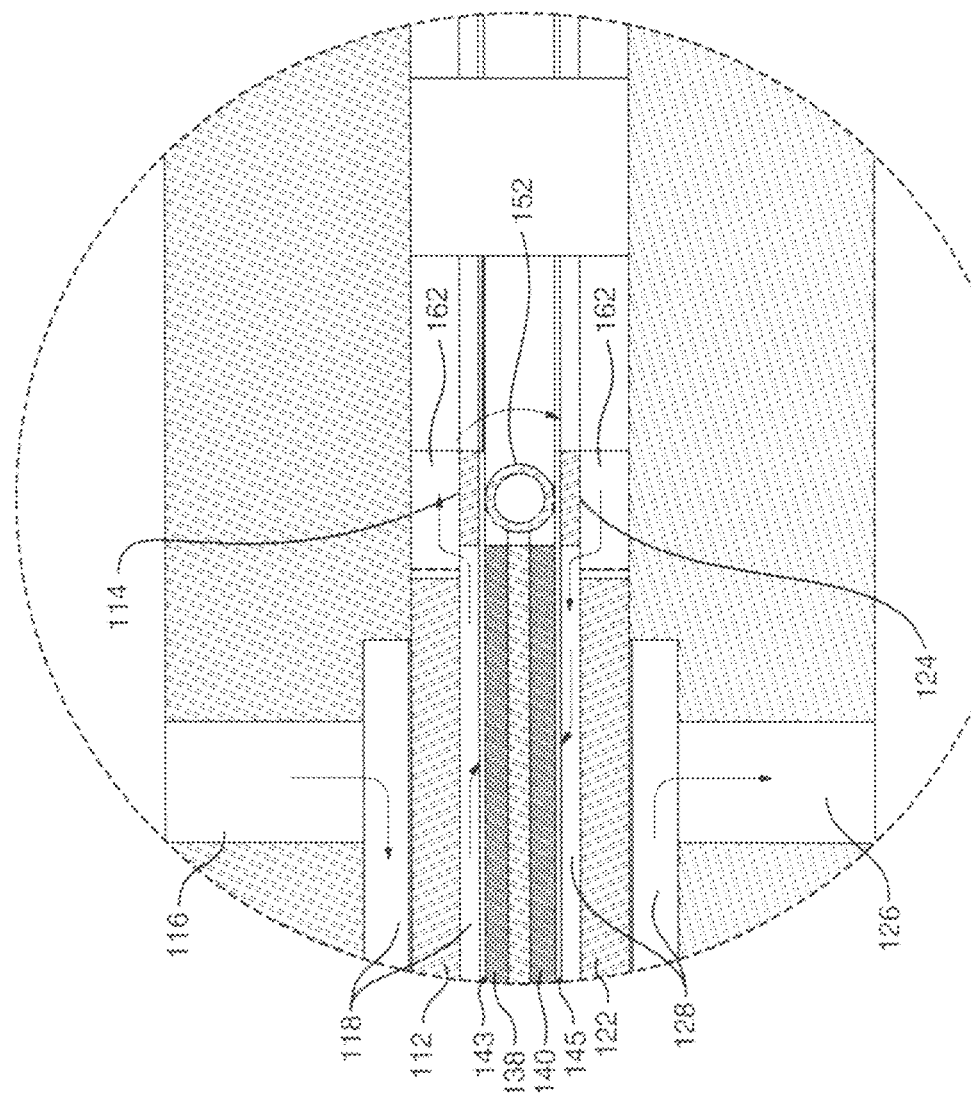
FIG. 4 illustrates a magnified cross-sectional view of a central region of a gas separation unit in accordance with the first embodiment of the subject technology.

Referring to FIGS. 1 and 4 and to the support of the inner peripheral edges of the first and second membrane assemblies 143 and 145, the section view of FIG. 4 is taken through a mixture flow slot 162 and the section view of FIG. 1 is taken between two flow slots 162. Each of the first and second membrane assemblies 143 and 145 includes an inside radius defined by a common center aperture 164. The center aperture 164 is formed through each of the permselective membranes 130 and 132 and through each of the microscreen elements 140 and 142 as well as through the input and output feed distribution plates 112, 122 and other elements of the permeate assembly 108 described below. The center aperture 164 substantially defines a hollow center chamber 166 at the center of the permeate assembly 108. An inner peripheral edge of each of the first membrane assembly 143 and the second membrane assembly 145 surrounds the center aperture 164 and is supported by contact with an inner o-ring 152. The inner o-ring 152 is disposed between the first and second membrane assemblies 143 and 145 with the inner o-ring 152 in mating contact with inner peripheral edges of first and second membrane assemblies 143, 145. A first inner backup ring 114 is disposed in contact with the first membrane assembly 143 opposed, to the inner o-ring 152. A second inner back up ring 124 is disposed in contact with the second membrane assembly 145 opposed to the inner o-ring 152. As viewed in the section view of FIG. 4, the first inner backup ring 114 contacts an inside surface of the input feed distribution plate 112 opposed to its contact with the first membrane assembly 143 and the second inner back up ring 124 contacts an inside surface of the output feed distribution plate 122 opposed to its contact with the second membrane assembly 145. The first and second inner backup rings 114, 124, each has a thickness selected to apply a compression force against the first membrane assembly 143 and to slightly compress the inner o-ring 152 when the gas separation unit 120 is assembled. The compression force generated by the first and second back up rings 114 and 124 compress the inner o-ring 152 to pressure seal the inner peripheral edge of the hollow cavity 134 and further pressure seals contact surfaces of the input and output feed distribution plates 112 and 124 with the end plates 110 and 120 to pressure seal inner peripheral edges of the first and second chambers 118 and 128.

As best viewed in the section view of FIG. 4, which is taken through a flow slot 162, the first and second chambers 118 and 128 are in fluid communication with the hollow center chamber 166 through each of a plurality of flow slots 162 formed in each of the input and output feed distribution plates 112 and 122. The flow slots 162 are evenly distributed around the center aperture 164, of each of the input and output distribution plates 112 and 122. The flow slot 162 is partially covered over by the top and bottom inner backup rings 114 and 124 but a fluid passage is provided from the second portion of the first chamber 118 through a flow slot 162, formed in the input feed distribution plate 112, to the hollow central chamber 166. Similarly a fluid passage is provided from the hollow central chamber 166 through a flow slot 162, formed in the output feed distribution plate 122, to the second portion of the second chamber 128. Thus according to one aspect of the subject technology, the gas mixture flows into the first chamber 118 and a permeate portion of the gas mixture passes through the first membrane assembly 143 and into the permeate assembly 108. The gas mixture then fills the central hollow chamber 166 and from there flows into the second chamber 128 where a permeate portion of the gas mixture passes through the second membrane assembly 145 into the permeate assembly 108. Thereafter, any remaining gas mixture flows out of the gas separation unit 102 through an output port 126.

Referring now to FIGS. 2-5, the first permselective membrane 130 supported by the first microscreen element 142 together form the first membrane assembly 143, and the second permselective membrane 132, supported by the second microscreen element 144, together form the second membrane assembly 145. As described above, the first membrane assembly 143 forms a boundary between the first chamber 118 and the hollow cavity 134 and the second membrane assembly 145 forms a boundary with the second chamber 128 and the hollow cavity 134. Moreover the first and second membrane assemblies 143 and 145 are annular in shape and substantially parallel with each other on opposing sides of the hollow cavity 134 with each first and second membrane assembly 143 and 145 supported at a circular outer perimeter edge thereof by contact with the top and bottom outer backup rings 156 and 158 and supported at a circular inner perimeter edge thereof by contact with the inner o-ring 152. The circular outer peripheral edge of each first and second membrane assembly 143 and 145 is clamped in place and pressure sealed by contact with a corresponding first and second outer o-rings 148 and 150 and the circular inner peripheral edge is clamped in place and pressure sealed by contact with a corresponding top and bottom inner backup rings 156 and 158 and the inner o-ring 152. In addition, each first and second membrane assembly 143 and 145 is assembled with the corresponding permselective membrane 130 and 132 facing the corresponding second portions of the first and second chambers 118 and 128.

The separation distance between the opposing first and second membrane assemblies 143 and 145 at the outer peripheral edges thereof is established by the thickness 157 of the permeate distribution ring 154 and the thickness of each of the outer backup rings 156 and 158. The separation distance between the opposing first and second membrane assemblies 143 and 145 at the inner peripheral edges thereof is established by the thickness of inner o-ring 152. In addition, the inner o-ring 152 pressure seals the hollow cavity 134 with respect to the hollow central chamber 166 such that permeate gas passing through the first and second membrane assemblies 143 and 145 is prevented from entering the hollow central chamber 166.

Referring to FIGS. 1-4, elements disposed inside the hollow cavity 134 between the first and second membrane assemblies 143 and 145 are provided to structurally support each membrane assemblies 143 and 145 to thereby prevent the first and second membrane assemblies 143 and 145 from bending or otherwise deforming due to gas pressure forces exerted on the permselective membranes 130, 132 by the elevated pressure of the gaseous feed mixture inside the first or second chambers 118 and 128. In addition to structurally supporting the first and second membrane assemblies 143 and 145, the elements disposed in the hollow cavity 134 are configured to allow the permeate gas to flow into and through the hollow cavity 134. In particular, the elements disposed inside the hollow cavity 134 may include flow channels formed therein or thereon or may be configured from a porous solid substrate such as a screen formed from strands woven together in a weave pattern to provide a structural element and with the wire strands separated by a mesh or wire center to center spacing to provide a void volume between the strands. In either case, the elements inside the hollow cavity 134 are configured to be in fluid communication with each of the microscreen elements while also providing a void volume designed to allow permeate gas to flow through the first and second membrane assemblies 143 and 145 and through the hollow cavity 134 to the permeate flow slots 160 and then to the peripheral flow channel 141 and eventually to the permeate gas output port 129.

In a preferred embodiment, the permeate assembly includes a top porous spacer 138 disposed in mating contact with the first microscreen element 142, a bottom porous spacer 140 disposed in mating contact with the second microscreen element 144 and a spacer shim 136 disposed between the top porous spacer 138 and the bottom porous spacer 140 in mating contact with each thereof. The combined thickness of the two porous spacers 138 and 140 plus the spacer shim 136 is substantially equal to the separation distance between the first and second membrane assemblies 143 and 145. As described above the separation distance between the first and second membrane assemblies 143 and 145 is set at the outer peripheral edge by the combined thickness of permeate distribution ring 154, and top and bottom outer back up rings 156 and 158 which are substantially parallel to each other.

As best viewed in FIG. 1, each of the porous spacers 138 and 140 as well as the spacer shim 136 is an annular shaped disk having an outside diameter, an inside diameter defined by the center aperture 164 and a thickness. Generally the porous spacers 138 and 140 are constructed from woven or non-woven wire stands or fibers cut or otherwise formed into an annular disk shape of the required dimensions. Preferably the porous spacers 138 and 140 comprise small diameter metal wire stands, e.g. (0.001 to 0.004 inch or 25 to 100 µm diameter) woven with a uniform mesh, or wire center to center spacing, (e.g. with a mesh of 25 to 200 wires per inch). The wires may comprise stainless steel, carbon steel, copper, copper alloy, aluminum or aluminum alloys. Alternately, the wire strands may comprise ceramics and or glasses such as fiberglass, silica cloth, or aluminum oxide cloth; or polymers such as nylon, polyethylene, or polypropylene or combinations thereof. Alternately, non-woven strands or wires are usable as well as loose granular particles. Ideally, the porous spacers 138, 140 are formed with sufficient stiffness to resist deformation by compressive forces due to fluid pressure acting on the permselective membranes 130, 132 to thereby structurally support each membrane assembly 143 and 145 and prevent excessive bending or deformation of the microscreen assemblies.

The spacer shim 136 comprises a solid substantially non-porous, non-compressible material that serves to reinforce and position the porous spacers 138 and 140 and to substantially block the permeate gas from flowing from one porous spacer 138 or 140 to the other. The spacer shim 136 and well as each of the porous spacers 138 and 140 are disposed within the inside diameter of the permeate distribution ring 154 and ideally each of the elements 136, 138 and 140 has an outside diameter that substantially matches the inside diameter of the permeate distribution ring 154 and the top and bottom outer back up rings 156 and 158 in order to minimize any gap between the back up ring inside diameter and porous spacer outside diameters. In particular, in regions where the permselective membranes 130 and 132 are unsupported across a gap, the membranes may develop gas leaks or ruptured due to pressure forces generated inside the first and second chambers 118 and 128.

According to an important aspect of the subject technology, the microscreens 142 and 144 each provide a support structure for supporting and preventing damage to the permselective membranes 130 and 132 and especially at the inner and outer peripheral edges of the permselective membranes where gaps between edges of the porous spacers 138 and 140 and the permselective membrane support structure could damage the membranes during operation. In order to minimize any gaps, the outside diameter of the shim spacer 136 and each of the porous spacers 138 and 140 is formed to substantially match or provide a small clearance with respect to the inside diameter of the permeate distribution ring 154 and the inside diameter of each the outer back up rings 156 and 158. In addition, as further detailed below and in FIG. 7, each microscreen element 142 and 144 is formed with a non-porous and structurally stiff outer peripheral edge 190 and a non-porous and structurally stiff inner peripheral edge 192 and ideally, the width of each outer and inner peripheral edge spans any gaps between the outer backup ring inside diameters and the woven mesh spacer outside diameters.

Alternately, the outside diameter of the spacer shim 136 may be slightly less than the outside diameter of the porous spacers 138 and 140 in order to provide a gas flow pathway from the porous spacer 138 to the permeate distribution ring flow slot 160.

In addition to supporting each permselective membrane across gaps, each microscreen element 142 and 144 is a protective layer between the permselective membranes 130 and 132 and the porous spacers 138 and 140 or between the permselective membranes and any other elements disposed inside the hollow cavity 134. More specifically, the microscreen elements 142 and 144 prevent the permselective membranes from being punctured by a wire strand or other puncture hazard, especial at inner and outer edges of the porous spacers 138 and 140 where ends of wire strands are exposed. In addition, the microscreen elements 142 and 144 prevent the permselective membranes from conforming to the shape of wire mesh pattern of the porous spacers 138 and 140 since this may also cause damage to permselective membranes.

While the combined thickness of the shim spacer 136 and the two porous spacers 138 and 140 is equal to the separation between the first and second membrane assemblies 143 and 145, the thickness of the shim spacer 136 is preferably less than the permeate distribution ring thickness 157 in order to a provide gas flow pathway from the porous spacer 138 to the permeate distribution ring flow slots 160. This flow pathway is shown in FIG. 3 by the permeate gas flow lines 170. Accordingly, permeate portions of the gaseous feed mixture flowing in the second portions of each of the first chamber 118 and the second chamber 128 pass through the permselective membranes, through a perforated or porous central area 194 of each microscreen element 142 and 144, and through void regions of porous spacers 138 and 140. The permeate gas flow through the porous spacers is substantially parallel with opposing surfaces of the spacer shim 136 and radially outward toward the permeate flow slots 160 that lead to the peripheral flow channel 141. Since the thickness of the spacer shim 136 is less than the thickness of the permeate distribution ring 154, the permeate gas can enter the permeate flow slots 160 as shown by permeate gas flow lines 170. Alternately or additionally, the diameter of the spacer shim 136 can be slightly reduced to further open up flow pathways from the porous spacers 138 and 140 into permeate flow slots 160.

Figure 7:
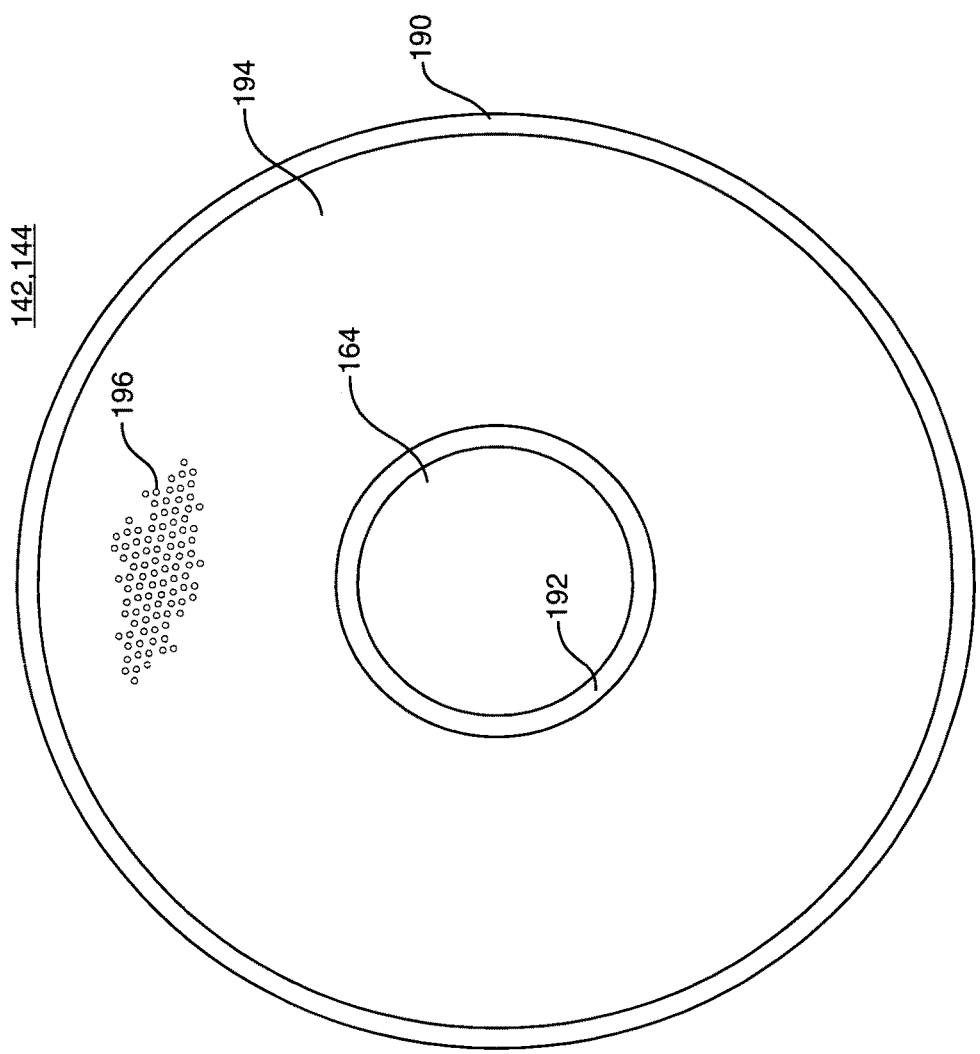
FIG. 7 illustrates a top view of a circular microscreen element in accordance the first embodiment of the subject technology.

Referring to FIG. 7, the microscreen elements 142 and 144 are substantially identical and each comprises an annular disk having an outside diameter and an inside diameter formed by the through aperture 164. The permselective membranes 130 and 132 are also formed as annular disks having an outside diameter and an inside diameter that substantially match the outside and inside diameters of the microscreen elements 142 and 144. The microscreen elements 142 and 142 further comprise a non-porous outer peripheral edge or outer perimeter wall 190, a non-porous inner peripheral edge or inner perimeter wall 192 and a perforated or porous center area 194 disposed between the outer peripheral edge 190 and the inner peripheral edge 192. The microscreen elements 142 and 142 are formed from a thin material layer that can be formed with porous and non-porous regions and that provides sufficient mechanical stiffness to support a thin permselective membrane across gaps and substantially prevent the membrane from being damaged or altered by mating contact with elements disposed inside the hollow cavity 134. Accordingly, the microscreen elements 142 and 144 may be formed from a thin non-porous metal sheet comprising stainless or carbon steel, copper or copper alloys, aluminum or aluminum alloys. Alternately, the microscreen elements 142 and 144 may be formed from a sheet or composite layer that includes a ceramic and or glass material such as a fiberglass composite, or a silica or aluminum oxide cloth. Alternately, the microscreen elements 142 and 144 may be formed from a unitary or composite sheet comprising formable polymers or the like, such as nylon, polyethylene, polypropylene, polysulfone, acrylics, polycarbonates, and epoxies.

It is desirable that the microscreen elements be formed with a high enough stiffness or resistance to bending or deflection to avoid deflection in gaps surrounding the porous spacers 138 and 140. More specifically, the stiffness of the microscreen elements is high enough to prevent the microscreen and the permselective membranes being supported by the microscreens from excessive deflection across gaps. Generally the stiffness of a microscreen element depends on the elastic modulus of the material, the material thickness and the size and shape of the unsupported area, all of which can be varied to increase the stiffness of a microscreen. While the preferred choice of materials and the material thickness of a microscreen element according to the subject technology may vary according to the thickness of the permselective membrane, the temperature of the elements, the chemical composition and pressure of the feed mixture, and the chemical composition of the permselective membranes as well as the mechanical dimensions of the hollow cavity 134, a preferred microscreen embodiment comprises 304 series or 316 series stainless steel having a thickness of 0.005 inches. More generally, the thickness of the microscreen elements may range from 0.001 inches to 0.020 inches.

The 304 series stainless steel is particularly suitable as a microscreen element because of its high chromium content, e.g. 18% chromium, and high nickel content, e.g. 8%, which provide the 304 series stainless steel with good resistance to corrosion, oxidation and oxidizing acids as well as to a wide variety of organic chemicals. In addition, 304 series stainless steel can be cold worked, e.g. by rolling it into a thin sheet, to increase it tensile strength. Although 316 series stainless steel is somewhat more expensive than is 304 series stainless steel, the former offers excellent corrosion and oxidation resistance and is a suitable material to use in lieu of 304 series stainless steel. It is further noted that in some embodiments, microscreen elements of the subject technology may be fabricated with sufficient stiffness to used without the backing of the woven mesh screens or other porous spacers housed inside the permeate assembly.

The non-porous outer peripheral edge 190 has a width that is at least as wide as the overlap of the microscreen elements 142, 144 with the corresponding top and bottom back up rings 156 and 158 and preferably the width of the outer peripheral edge 190 is wide enough to span a gap at the interface between the back up rings and the woven mesh spacers 138 and 140. The non-porous inner peripheral edge 192 has a width that is at least as wide as the overlap of the microscreen elements 142, 144 with the corresponding first and second inner back up rings 114 and 124 and preferably the width of the inner peripheral edge 192 is wide enough to span a gap at the interface between the inner o-ring 152 and the porous spacers 138 and 140.

The perforated or porous center region 194 includes a large number of apertures 196 passing therethrough to allow permeate gas passing through the permselective membranes 130 and 132 to pass through the apertures 196 and into the top and bottom porous spacers 138 and 140. Ideally, the apertures 196 are formed with a pattern that maximizes the combined aperture area while maintaining a high enough stiffness of the microscreen element to prevent excessive deflection under a pressure load. For example, aperture diameters ranging from about 0.003 inches to 0.020 inches are usable with aperture center to center spacing ranging from about 0.005 inches to 0.025 inches. Such an aperture pattern can be formed in metal sheets using electrochemical etching, laser drilling and other mechanical forming processes, such as stamping or die cutting. Alternately, microscreens may be fabricated from a porous layer such a woven fabric that is further processed to form the non-porous perimeter edges as required. In addition, microscreens according to the subject technology may be formed with non-porous peripheral edges 190 and 192 that have a greater thickness than the thickness of the center porous 194 to further stiffen the peripheral edges.

Various permselective membranes 130 and 132 are usable according to the subject technology and the selection of the membrane type and thickness will depend on the permeate gas, the gas pressure and temperature and the dimensions of the permeate gas assembly 108. In cases where the membrane material comprises precious metals or other high cost materials, it is desirable to minimize the amount of membrane material used to reduce the cost of the element. It is further desirable to minimize the membrane material thickness since the flow of permeate gas through the membrane is inversely proportional to the membrane thickness. In a preferred embodiment of the subject technology, the gas separation unit 102 is configured to separate or permeate pure hydrogen from a gaseous feed mixture comprising hydrogen and other gases and or vapors and the permselective membranes 130 and 132 are formed from a thin metal foil that comprises palladium and preferably a palladium-copper or palladium-silver alloy. Specific and unique chemical properties of hydrogen gas render these palladium alloys (and pure palladium) permeable to hydrogen based on a solution-diffusion mechanism. Especially preferred alloys of palladium include palladium-silver (such as palladium with 23-25 wt % silver), palladium-copper (such as palladium with 39-41 wt % copper and palladium with 15-25 wt % copper), and palladium-gold (such as palladium with 3-7 wt % gold). Many other useful alloys of palladium are known in the art, and are distinguished by possessing a substantial permeability to hydrogen combined with chemical inertness to other gases in the gas mixture from which hydrogen is to be separated when operated as a gas separation membrane.

More specifically, the preferred thin metal foils have a material thickness of less than about 0.002 inches (approximately 50 µm) with foil thicknesses in the range of 0.00008 inches to 0.0006 inches (approximately 2-15 µm) being preferred. Such foils are known and can be fabricated using techniques such as conventional reel-to-reel rolling, chemical etching of a sheet or foil precursor area or by sputtering, vacuum evaporating, electrochemical plating of otherwise depositing a palladium alloy onto a substrate, as may be required. In addition, the gas separation unit 102 described above is usable to support other non-porous (such as polymeric membranes) or microporous membrane types (such as microporous polymeric and ceramic membranes that operate based on Knudsen diffusion or surface diffusion) to separate a permeate gas from a gaseous feed mixture or a liquid feed mixture as required. Moreover, the gas separation unit of the subject technology may be configured with membrane material that are suitable for separation based on various chemical and/or physical separation processes and those skilled in the art would appreciate that selected properties of the gas to be separated are exploited to separate the gas from the gaseous feed mixture.

According to a preferred embodiment of the gas separation unit 102 the end plates 110 and 120 comprise formed metal elements such as cast or machined aluminum or steel. Elements of the separation unit 102 are assembled together in a stack and three alignment pins 173 are installed into corresponding alignment holes 175 formed in the end plates 110 and 120. The alignment pins 173 are positioned to pass through the hollow cavity 166 and to contact a circumferential edge of the common center aperture 164 formed through various elements to align the various elements along the central axis 105. Preferably all of the elements of the gas separation unit 102 are formed from metals, including the o-rings 148, 150 and 152 which comprise hollow metal o-rings. Alternately, various elements such as the end plates 110, 120, the spacing ring 146, the shim spacer 136, the inner backup rings 114, 124, the outer back up rings 156, 158 and the feed distribution plates 112 and 122 may be formed from polymers suitable for molding to the desired tolerances provided that the polymers suitable for the operating temperatures and chemical environments are available.

Referring to FIGS. 6A and 6B, in an alternate configuration of the gas separation unit 102 of the subject technology, the woven wire mesh spacers 138 and 140 and the spacer shim 136 may be replaced by a unitary grooved spacer shim 174. The unitary grooved spacer shim 174 comprises an annular disk having an outside diameter sized to substantially match the inside diameters of the permeate distribution ring 154 and the outer backup rings 156 and 158, with a slight clearance with respect thereto, and an inside diameter defined by a center aperture 164. Opposing surfaces of the annular disk 178 and 180 are formed with first rows of parallel grooves 184 and second rows of parallel grooves 186 formed thereon.

In the example embodiment, the first rows 184 are perpendicular to the second rows 186 such that substantially isolated material lands 186 are disposed over each of the surfaces 178 and 180. The annular disk 178 has a thickness 176 that extends to the tops of opposing material lands 186 and the thickness 176 is formed to match the separation distance between the first membrane assembly 143 and the second membrane assembly 145 such that the tops of the material lands 186 are in mating contact with a corresponding microscreen element 142 or 144. In this embodiment, the rows of grooves 184 and 186 are in fluid communication with the porous central area 194 of each of the microscreen elements 142 and 144 such that permeate gas passing through the porous central areas 194 flows into the rows of grooves 182 and 184 and along the void volume between the material lands 186 to the flow slots 160. In addition, the annular disk 178 may include a plurality of short flow slots 183 passing through the annular disk 178 proximate to its outer peripheral edge and positioned to align with the flow slots 160 formed in the permeate distribution ring 154 so that the flow slots 183 provide gas flow channels from the grooves 182 and 184 to the flow slots 160. In a preferred embodiment, the rows of surface grooves 182 and 184 may have dimensions ranging from 0.001 inches to 0.100 inches wide by 0.001 inches to 0.100 inches deep with any cross-section e.g., square, rectangular, half round or triangular. The width of material lands 186 may range from 0.003 inches to 0.10 inches. Alternately, the surfaces 178 and 180 may be processed in any manner that provides isolated material lands 186 having the desired dimensions, e.g. 0.005 by 0.005 inches square, separated by an interconnected void volume.

Figure 8:
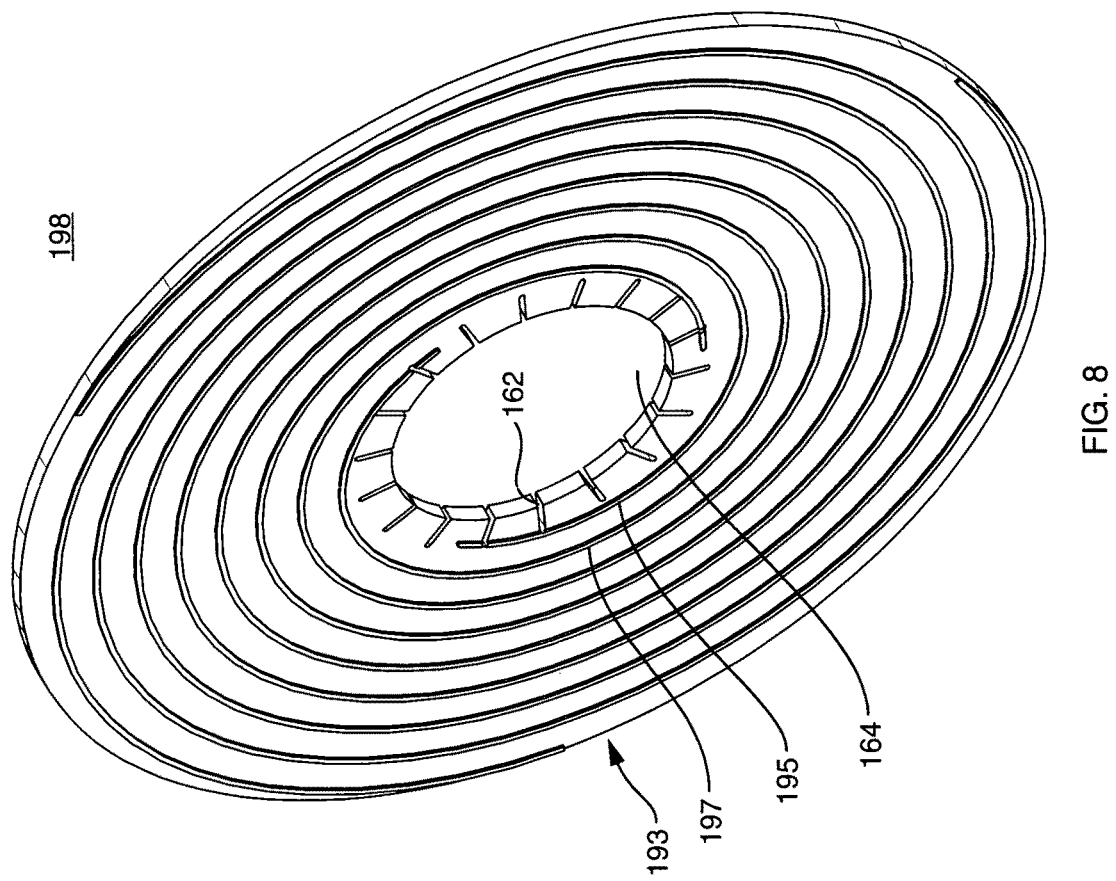
FIG. 8 illustrates an isometric view of a modified input feed distribution plate in accordance with an alternate configuration of the first embodiment of the subject technology.

Referring to FIG. 8, in another alternate configuration of the gas separation unit 102 of the subject technology, the input feed distribution plate 112 and output feed distribution plate 122 may be replaced by a modified distribution plates 198 that includes ridges or other raise features 195, 197 on one face thereof. The alternate input feed distribution plates 198 comprises an annular disk having an outside diameter and an inside diameter defined by the aperture 164, with a plurality of mixture flow slots 162 formed through the disk thickness and disposed around the aperture 164. In addition, an annular face 193 of the annular disk 198 includes a plurality of spiral ridges 195 and 197 formed to protrude upward from the annular face 193. The ridges are disposed to face the first and second permselective membranes 130 and 132, with the top of each ridge 195, 197 proximate to a corresponding permselective membrane 130 or 132 to disrupt flow of the feed mixture over the permselective membranes thereby generating turbulent flow. The turbulent flow provides mixing of the feed gas to improve permeate flow through the permselective membranes.

Figure 9:
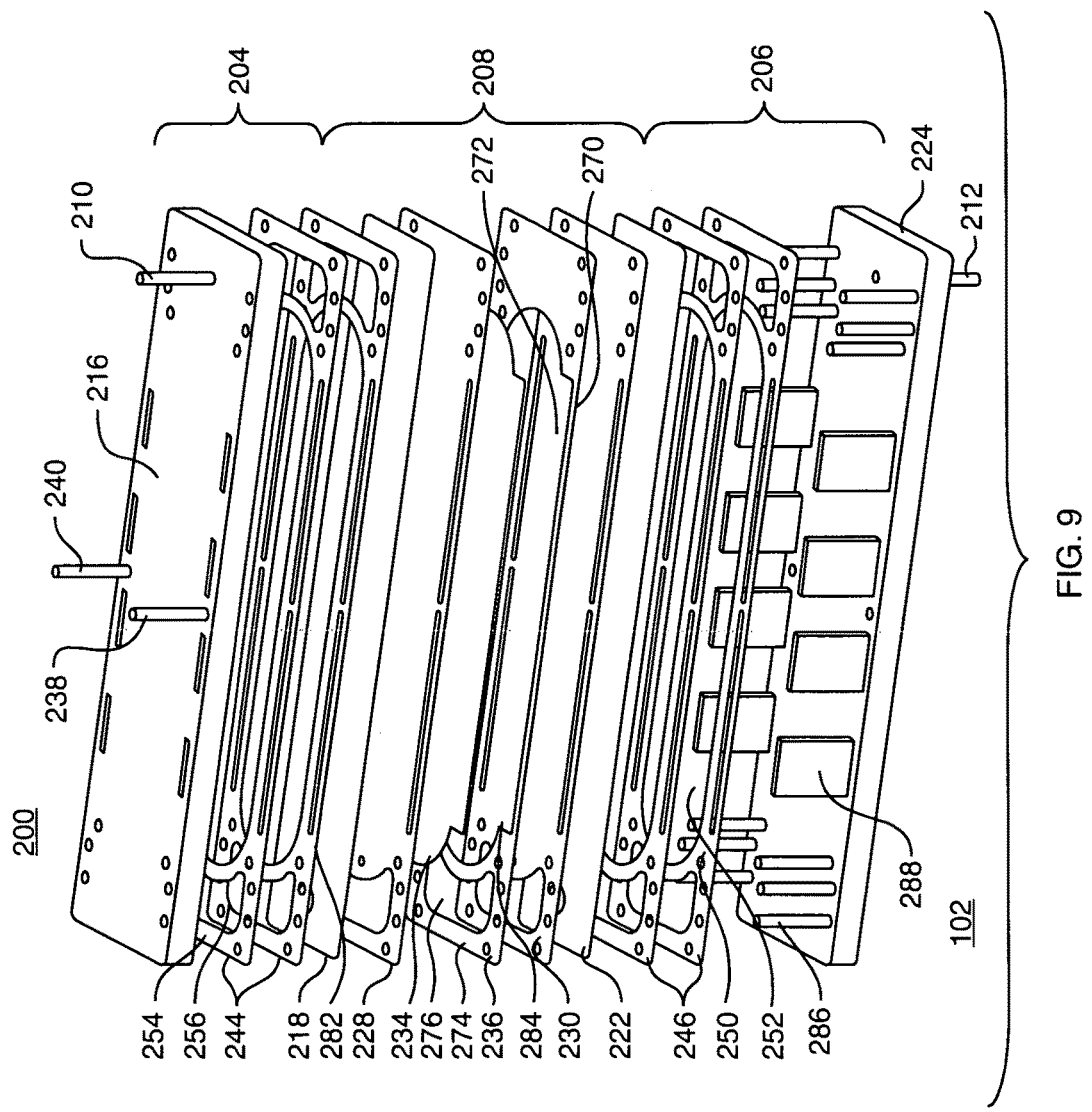
FIG. 9 illustrates an exploded view of a gas separation unit in accordance with a second embodiment of the subject technology.
Figure 10:
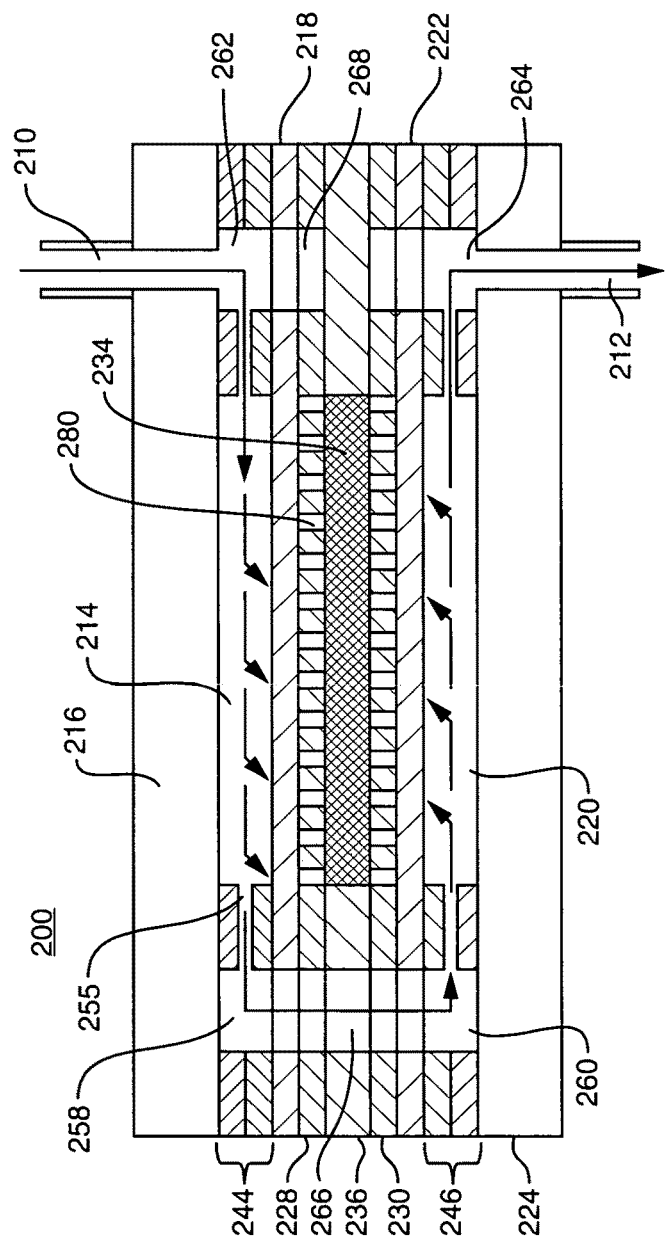
FIG. 10 illustrates a longitudinal section view depicting gas mixture flow paths of a gas separation unit in accordance with a second embodiment of the subject technology.
Figure 11:
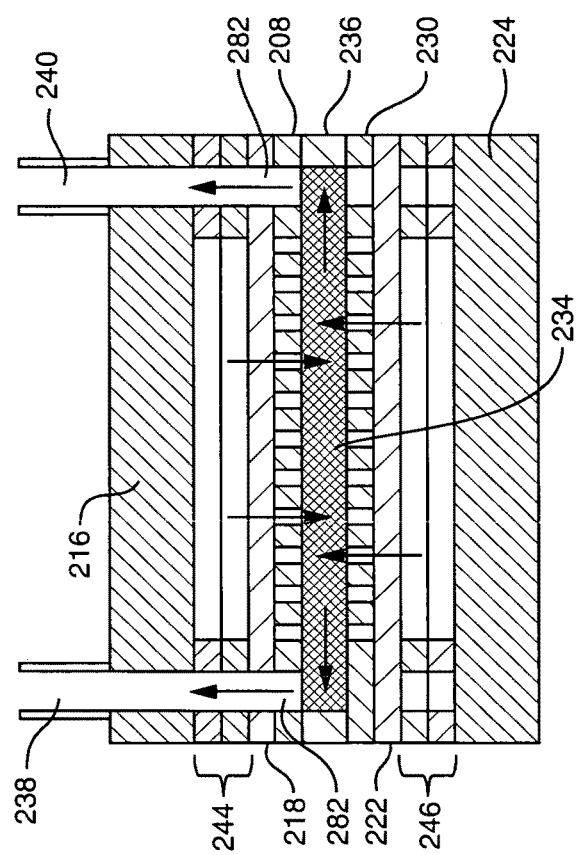
FIG. 11 illustrates a transverse section view depicting permeate gas flow pathways of a gas separation unit in accordance with a second embodiment of the subject technology.

Referring to FIGS. 9-11, a second embodiment of a gas separation unit 200 in accordance with the subject technology is shown in various views. In the second embodiment, the gas separation unit 200 has a rectangular cross-section formed with a longitudinal length and a transverse width and except for the permselective membranes 218 and 222, each of the elements stacked together to form the gas separation unit 200 have a substantially identical longitudinal and transverse perimeter dimensions. The gas separation unit 200 includes an input manifold 204, an output manifold 206 and a permeate assembly 208. The input manifold 204 receives the feed gas mixture through an input port 210. The permeate assembly 208 is disposed between the input manifold 204 and the exhaust manifold 206 to separate permeate gas out from the gaseous feed mixture and to deliver permeate gas out from the gas separation unit 200 through a pair of permeate output ports 238 and 240 which pass through the input manifold 204. Although FIG. 9 shows two permeate output ports 238 and 240, it is within the scope of the subject technology to use a lesser number of permeate ports (e.g., one) or a greater number of permeate ports (e.g., two or more). The permeate assembly 208 of the present example includes two permselective membranes 218 and 222 and two microscreen elements 228 and 230. In other embodiments, additional permeate assemblies can be stacked in series with the permeate assembly 208 without deviating from the subject technology.

The input port 210 delivers a gaseous mixture, that includes a permeate gas, into a first chamber 214. The first chamber 214 is bounded at a top side thereof by an internal surface of a top end plate 216. The first chamber 214 is further bounded at a bottom side thereof by a first permselective membrane 218 supported on a first microscreen element 228. The output manifold 206 includes as second chamber 220. The second chamber 220 is bounded at top side thereof by a second permselective membrane 222 supported on a second microscreen element 230. The second chamber 220 is further bounded at a bottom side thereof by an internal surface of a bottom end plate 224. The input manifold 204 includes a first pair of substantially identical feed plates 244 disposed between the top end plate 216 and the first permselective membrane 218. The output manifold 206 includes a second pair of substantially identical feed plates 246 disposed between the bottom end plate 224 and the second permselective membrane 222. In each example, the pair of feed plates 244 and 246 can be replaced by a unitary feed plate element without deviating from the subject technology.

The feed plates 244 and 246 comprise thin metal frames, e.g. stampings, and each metal frame includes a main perimeter wall 250 surrounding a main through aperture 252. The feed plates 244 and 246 also include one or more end perimeter walls 254 surrounding end through apertures 256 at opposing ends of the feed frame 244 and 246. The feed frames 244 and 246, when sandwiched together in mating contact with each other and between the first permselective membrane 218 and the internal surface of the end plate 216 or between the second permselective membrane 222 and the internal surface of the end plate 224, form side walls of the first chamber 214 and the second chamber fluid 220. More specifically, the first chamber 214 is formed by the main aperture 252 and is bounded by the main perimeter wall 250 of the first pair of feed plates 244 and the second chamber 220 is formed by the main aperture 252 and is bounded by the main perimeter wall 250 of the second pair of feed plates 246.

The end perimeter walls 254 of each of the feed frame pairs 244 and 246 form side walls of a first left end chamber 258, a second left end chamber 260, a first right end chamber 262, and a second right end chamber 264. In addition, the feed frames 244 and 246 are configured with grooves or slots formed thereon to form fluid passages 255 that extend between the first chamber 214 and each of the first left and right end chambers 258 and 262 as well as between the second chamber 220 and each of the second left and right end chambers 260 and 264. In addition, the permeate assembly 208 is configured to include a first fluid passage 266 passing between the first and second left end chambers 258 and 260. In addition, the permeate assembly 208 may also include a second fluid passage 268 passing between the first and second right end chambers 262 and 264. However in the present embodiment, the second fluid passage 268 is blocked by a permeate frame 236 in order to direct feed gas entering the first right chamber 262 into the first chamber 214.

The permeate assembly 208 is configured with the first permselective membrane 218 supported in mating contact with a first microscreen element 228 and the second permselective membrane 222 is supported in mating contact with a second microscreen element 230. In turn, each of the microscreen elements 228 and 230 are supported in mating contact with opposing surfaces of a permeate frame 236. The permeate frame 236 comprises a thin metal frame, e.g. a stamping, formed by a main perimeter wall 270 surrounding a main through aperture which forms a hollow cavity 272 surrounded by the main perimeter wall 270. The permeate frame also includes an outer perimeter wall 274 surrounding a left end through aperture 276 which helps to form the flow passage 266. In alternate configurations, the permeate frame 236 may also include a right end through aperture, to open the flow passage 268 as required by the configuration. As best viewed in FIG. 9, the hollow cavity 272 is substantially oval shaped at each end thereof but has a widened longitudinal dimension formed by a cutout 284 on each of its longitudinal edges.

A porous spacer 234 having substantially the same thickness as the permeate frame 236 is disposed in the hollow cavity 272 between the opposing microscreen elements 228 and 230 with opposing surfaces of the porous spacer 234 in mating contact with a corresponding microscreen element 228 or 230. Ideally the perimeter dimensions of the porous 234 are sized to substantially match the perimeter dimensions of the hollow cavity 272 in order to reduce the width of a gap between mating perimeter edges of the porous spacer 324 and the hollow cavity 272.

Figure 12:
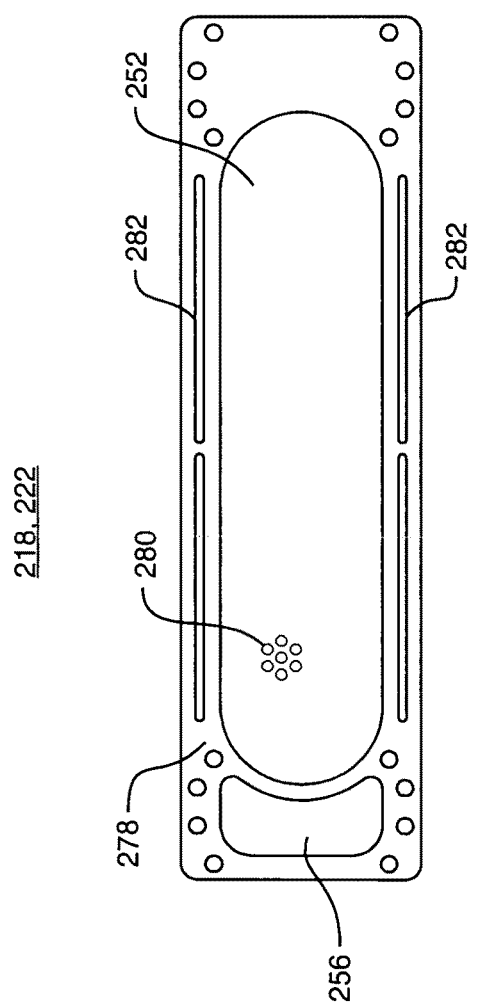
FIG. 12 illustrates a top view of a rectangular microscreen element in accordance with the second embodiment of the subject technology.

Referring to FIG. 12, the microscreen elements 228 and 230 are substantially identical and each includes a solid non-porous perimeter wall 278 surrounding a perforated or porous central area 232. In addition, the microscreen elements include a left end through aperture 256 that substantially aligns with the left end through apertures of the feed frames 244 and 246 and the permeate frame 236 to help form the first fluid passage 266. The microscreen elements 228 and 230 may also include a right end through aperture, not shown, that substantially aligns with right end through apertures of the feed frames 244 and 246 and the permeate frame 236 and may help form the second fluid passage 268 as required.

The perforated or porous central area 232 is oval shaped and positioned to substantially align with the main apertures 252 of each feed frame pairs 244 and 246. The perforated or porous central area 232 also extends over the central cavity 272 and may or may not extend over the longitudinal notch 284. The microscreen elements 228 and 230 each comprise a substantially uniform, non-porous, gas-impermeable material layer and the perforated or porous center region 232 is made by forming a large number of apertures 280 there through. The through apertures 280 allow permeate gas passing through the permselective membranes 218 and 222 to pass through the perforated or porous central area 232 and into the hollow cavity 272 through the porous spacer 234. Ideally, the through apertures 280 are formed with a pattern that maximizes the combined area of all the apertures 280 while maintaining a desired stiffness of the microscreen element. For example, circular apertures having a diameter ranging from about 0.003 inches to 0.020 inches with aperture center to center spacing ranging from about 0.005 inches to 0.025 inches are usable and can be formed in a uniform thickness metal sheet using electro-chemical etching, laser drilling and other mechanical forming processes. Alternately, microscreens may be fabricated from a substantially porous layer such a woven fabric that is further processed to form non-porous perimeter edges as required. In addition, microscreens according to the subject technology may be formed with non-porous peripheral edges having a greater thickness than the thickness of the porous central area. In addition, the size and shape of the microscreen perforated or porous central area 232 can be adjusted to extend the non-porous solid perimeter 278 over a gap area as required to further protect the foil membrane.

More generally, the microscreen elements 228 and 230 each comprise a material layer that can be formed with perforated or porous regions, as well as non-porous regions, and that provide sufficient mechanical stiffness to support a permselective membrane, such as a very thin metal foil, across gaps between a peripheral edge of the hollow cavity 272 and a perimeter edge of the porous spacer 234 to substantially prevent the foil membrane from being damaged or altered by being forced into the gaps by forces arising from pressurized fluids within the input manifolds and output manifolds, and or from being damaged by mating contact with elements disposed inside the hollow cavity 272, e.g. by metal wires woven together to form the porous spacer 234. Accordingly, the microscreen elements 228 and 230 may be formed from a thin metal sheet comprising stainless or carbon steel, copper or copper alloys, aluminum or aluminum alloys. Alternately, the microscreen elements 228 and 230 may be formed from a sheet or composite layer that includes a ceramic and or glass material such as a fiberglass composite, or a silica or aluminum oxide cloth. Alternately, the microscreen elements 228 and 230 may be formed from a unitary or composite sheet comprising formable polymers or the like, such as nylon, polyethylene, polypropylene, polysulfone, acrylics, polycarbonates, and epoxies. While the preferred choice of materials and the material thickness of a microscreen element according to the subject technology may vary according to the temperature, chemical composition and pressure of the gaseous mixture, and the chemical composition of the permselective membranes as well as the mechanical dimensions of the permeate assembly, a preferred microscreen embodiment comprises 304 series or 316 series stainless steel having a thickness of 0.005 inches. More generally, the thickness of the microscreen elements may range from 0.001 inches to 0.020 inches.

Each of the first and second permselective membranes 218 and 222 comprises a thin membrane having a substantially uniform material thickness over a rectangular area that at least over laps the dimension of the perforated or porous central area 232. In the example embodiment, the permselective membranes have a longitudinal dimension matching the length of the gas separation assembly 200 and a transverse dimension that exceeds the transverse dimension of the porous central area 232 but is less than the transverse separation between a plurality of longitudinal slot 282 described below. However, it is within the scope of the subject technology for the transverse dimension of the permselective membrane to be equal to, or greater than, the transverse dimension of microscreen elements 228 and 230. In the assembled gas separation unit, the first permselective membrane 218 is positioned in mating contact with the first microscreen element 228, facing the first chamber 214, and the second permselective membrane 222 is positioned in mating contact with the second microscreen element 230, facing the second chamber 220. Accordingly, each permselective membrane 218 and 222 is in mating contact the perforated or porous central area 232 of a microscreen element and each porous central area 232 is in mating contact with a surface of the porous spacer 234. Accordingly when a gaseous feed mixture is delivered into the gas separation unit 200 at an elevated pressure, the gaseous feed mixture fills the first and second chambers 214 and 220 and a permeate portion of the gaseous mixture begins to flow through the permselective membranes 218 and 222 and through the microscreen elements 228 and 230 in the areas of the permselective membranes that are in mating contact with the perforated or porous central area 232. The permeate gas then enters the central cavity 272 through void volumes of the porous spacer 234.

To remove permeate gas from the permeate assembly 208, a plurality of longitudinal slots 282 are formed through the main perimeter walls of the feed frames 244 and 246, and through perimeter edges of the micros screen assemblies 228 and 230. The longitudinal slots 282 overlay the longitudinal notches 284 which extend along opposing longitudinal edges of the hollow cavity 272. Each of the longitudinal notches 284 are fluidly connected with the hollow cavity 272 such that permeate gas flowing through the porous spacer 234 flows from the longitudinal notches 284 to the longitudinal slots 282 which are fluidly connected to the exit ports 238 and 240.

Referring to FIG. 10, an example flow path of the gaseous mixture through the gas separation device 200 is shown in a longitudinal section view which depicts the gaseous feed mixture passing from the input port 210 to the first right end chamber 262. From the first right end chamber 262, gaseous feed mixture flows into the first chamber 214 through a flow passage 255 formed between the pair of feed frames 244. From the first chamber 214, the gaseous feed mixture flows into the first left chamber 258, through a flow passage 255 and then through the first fluid passage 266, into second left chamber 260. The feed mixture then flows into the second chamber 220. In each of the first and second chambers 214 and 220 a permeate portion of the gaseous feed mixture passes through the first and second permselective membranes 218 and 222. On the right side of the second chamber 220 the gaseous feed mixture flows through the flow passage 255 formed between the pair of feed frames 246 into the second right end chamber 264 where it can flow out of the gas separation unit 200 through an output port 212 passing through the end plate 224.

Referring to FIG. 11, an example flow path of the permeate gas through the gas separation device 200 is shown in the transverse section view which depicts the permeate gas flowing out of the hollow cavity 272 and through the longitudinal slots 282 to exit ports 238 and 240.

The gas separation device 200 includes a plurality of alignment pins 286 and rectangular alignment elements 288 fixedly attached to one or the other end plates 224 or 216. The alignment pins and elements 286 and 288 align with through holes passing through various elements of the gas separation unit 200 and may form a press fit with alignment holes in each of the end plates such that the alignment pins 286 and rectangular elements 288 may also serve as fasteners for fastening the stack together. The stack is tightly clamped together using a compression force applied to opposing external surfaces of the end plates 216 and 224 so that mating surfaces of opposing elements are pressure sealed as well as fastened in place by the compression force. In addition, one or more clamping elements or fasteners may be used to apply and maintain the compression force.

In alternate embodiments of the gas separation device 200 two or more permeate assemblies 208 can be stacked together between the end plates 216 and 224 with a pair of feed frames 244 stacked between each pair of permeate assemblies 208. In addition various gaseous mixture flow paths can be configured by configuring the end through apertures 256 of various elements of the stack to open or close the flow paths 266 and 268 to achieve a generally parallel feed flow over the permselective membranes, or a generally serial feed flow over the permselective membranes, or a combination of parallel and series feed flow over the permselective membranes. In a further alternate embodiment of the rectangular gas separation unit 200, the porous spacer 234 may be replaced with a surface-grooved plate such as the one shown in FIGS. 6A and 6B but with a rectangular cross-section and with the surface grooves formed to direct permeate gas to the longitudinal notch 284 for exit through the longitudinal slots 282.

In the special case of separating hydrogen (the permeate gas) from the gaseous feed mixture (such as a mixture of hydrogen with one or more of the following gases: carbon dioxide, carbon monoxide, water vapor, methane, nitrogen, or other gaseous mixtures) the permselective membranes 218 and 222 may be composed of an alloy of palladium. The permselective membranes 218 and 222 are preferably formed as a foil that comprises palladium with a foil thickness of less than about 0.002 inches (approximately 50 µm) with foil thicknesses in the range of 0.00008 inches to 0.0006 inches (approximately 2-15 µm) being preferred.

Especially preferred alloys of palladium include palladium-silver (such as palladium with 23-25 wt % silver), palladium-copper (such as palladium with 39-41 wt % copper and palladium with 15-25 wt % copper), and palladium-gold (such as palladium with 3-7 wt % gold). Many other useful alloys of palladium are known in the art, and are distinguished by possessing a substantial permeability to hydrogen combined with chemical inertness to other gases in the gas mixture from which hydrogen is to be separated when operated as a gas separation membrane.

Figure 13:
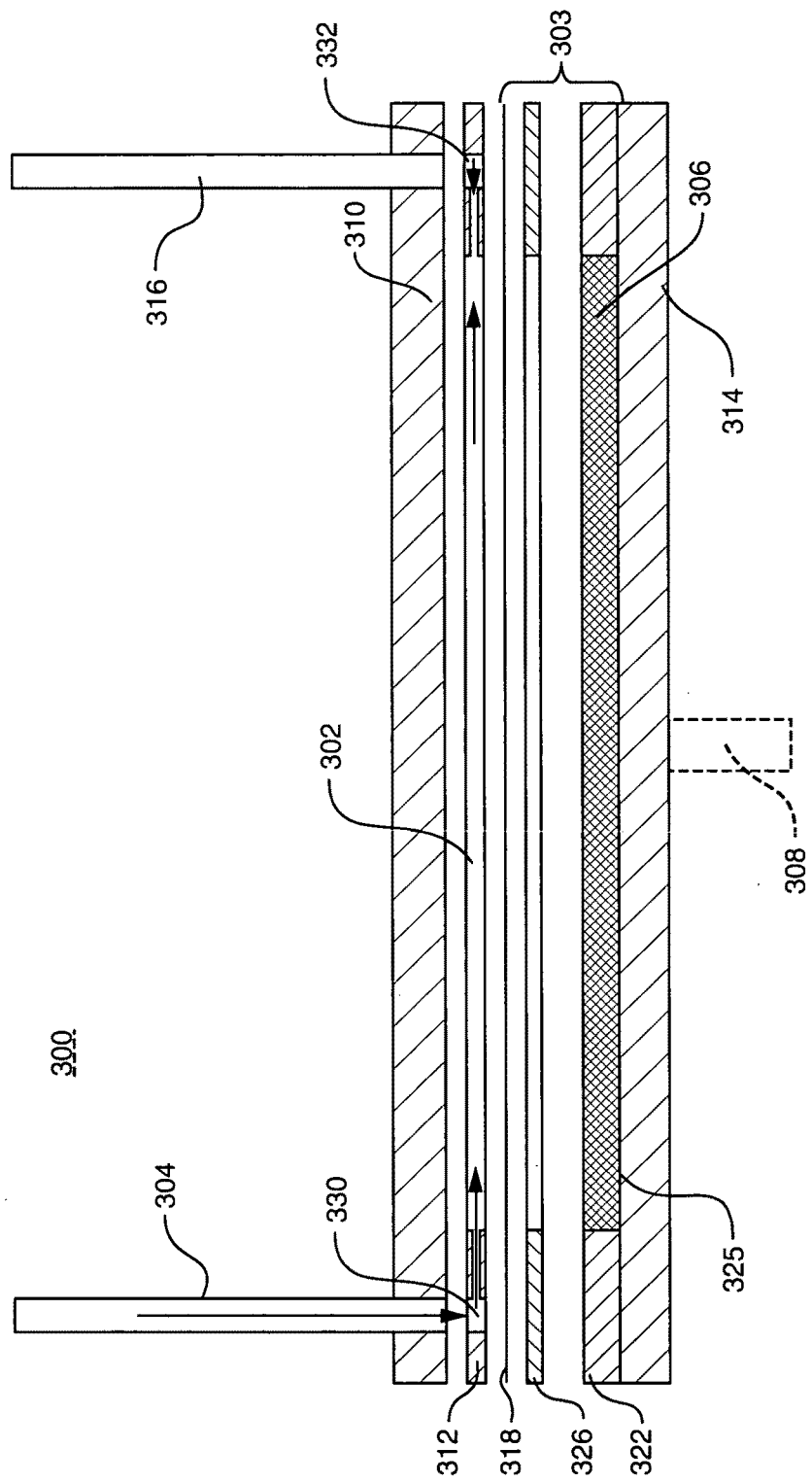
FIG. 13 illustrates a longitudinal section view depicting gas mixture flow pathways of a gas separation unit in accordance with a third embodiment of the subject technology.
Figure 14:
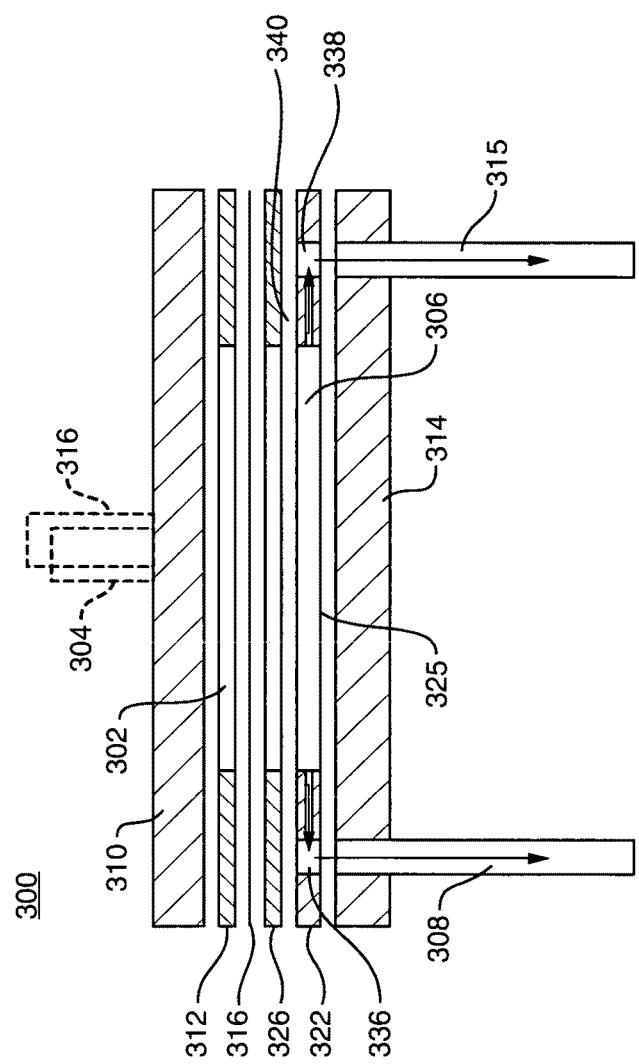
FIG. 14 illustrates a transverse section view depicting permeate gas flow pathways of a gas separation unit in accordance with a third embodiment of the subject technology.

Referring now to FIGS. 13-14, a third embodiment of a gas separation unit 300 in accordance with the subject technology includes a single permselective membrane 318 disposed in mating contact with a single microscreen element 326. The gas separation unit 300 has a rectangular cross-section with a longitudinal length shown in section view in FIG. 13, which shows the flow pathway of a gaseous feed mixture, and a transverse width shown in section view in FIG. 14, which shows the flow pathway of a permeate gas separated out from the gaseous mixture.

An input manifold comprises a top plate 310 and a pair of feed frames 244 configured as described above. The feed frames 244 form a left end chamber 330 a first chamber 302 and a right end chamber 332. A gaseous feed mixture, that includes a permeate gas, enters into the left end chamber 330 through an input port 304, passes from the left end chamber 330 to the first chamber 302 and then to the right end chamber 332, where the gaseous mixture can exit the gas separation unit 300 through an exit port 316. Alternately, the feed frame pair may comprise a single feed frame element 312 configured to form a the first chamber 302 with the input port 304 and the output port 316 both in fluid communication with the first chamber 302.

The gas separation unit 300 includes the permeate assembly 303 in mating contact with the input manifold for separating a permeate gas from the gaseous mixture. The permeate assembly 303 includes a microscreen element 326 disposed in mating contact with a permeate frame 322 and the permselective membrane 318 is supported in mating contact with microscreen element 326 facing the first chamber 302. The permeate frame 322 includes a perimeter wall surrounding a through aperture that forms a hollow cavity 306. The hollow cavity 306 is sealed at a bottom end thereof by a bottom plate 314. The hollow cavity 306 is sealed at a top end thereof by contact between a non-porous perimeter wall of the microscreen element 326 and the perimeter wall of the permeate frame 322. The permeate frame also includes fluid passages 340 leading to left and right chambers 336 and 338 which provide permeate gas flow paths from the hollow chamber 306 to deliver permeate gas to a pair of output ports 308 and 315. Although two gas flow paths 336 and 338 are shown, a greater number of gas flow paths or lesser number of gas flow paths may be used.

The microscreen element 326 includes a perforated or porous central area shaped to match the shape of the hollow cavity 306. A porous spacer 325 having a thickness substantially matched with the thickness of the permeate frame 322 is disposed to substantially fill the hollow cavity 306 and to make mating contact with the perforated or porous central area of the microscreen element 326. The porous spacer 325 may comprise a woven mesh screen or other material having interconnected void volume that allows permeate gas to flow multi-directionally through the void volume. In addition, the material of the porous spacer 325 has sufficient structural stiffness to support the microscreen element 326 against pressure forces generated in the first chamber 302. As in the above described embodiments, the microscreen element is a thin layer used to support a permselective membrane foil across the hollow cavity 306 and across perimeter gaps between peripheral edges of the hollow central cavity 306 and the porous spacer 325. Alternatively, a non-porous plate may be used in place of the porous spacer 325 provided that the non-porous plate has a plurality of interconnected surface grooves sufficiently sized to allow the permeate to flow through the porous central area of the microscreen element 326 and the through the hollow chamber 306 to fluid passages 340. In a preferred embodiment, all of the materials of the gas separation unit 300 comprise metals suitable for performing their required structural and chemical functions at the pressure and temperature of the separation process. However other materials having the desired characteristics are usable without deviating from the subject technology.

Referring to FIGS. 13-14, the gaseous feed mixture is forced into the first chamber 302 at elevated pressure. Permeate gas included in the gaseous feed mixture permeates through the permselective membrane 318 in the area where the permselective membrane 318 is supported by the perforated or porous central area of the microscreen element 326 and passes therethrough into the hollow cavity 306. The permeate gas flows through the porous spacer 325 to fluid passages 340 and fluid conduits 336 and 338 and out of the gas separation unit 300 through exit ports 308 and 315. Although two exit ports are shown in the FIGS. 13 and 14, it is understood that only one permeate exit port may be used, or three or more permeate exit ports may also be used.

As has been disclosed above, the porous spacer 325 may be replaced with a surface-grooved plate such the one shown in FIGS. 6A and 6B but with the surface grooves formed on only one surface to direct permeate gas to one or more exit ports. Also as described above, the permselective membrane 318 may comprise a thin hydrogen-permeable metal layer such as palladium-silver, palladium-copper or palladium-gold.

In further aspects of the subject technology, a layer of permselective material may be directly formed onto a surface of a microscreen element such as the microscreen elements 142, 144, 218, 222, and 326 described above and shown in FIGS. 7, 12, and 13 in accordance with the subject technology. More specifically, microscreen elements 142, 144, 218, 222, and 326 may be fabricated with a thin hydrogen-permeable metal layer formed directly onto the perforated or porous central areas thereof.

After an appropriate layer of hydrogen-permeable metal has been coated onto the microscreen element second surface, the removable mask is removed from the first surface. Typically a solvent or chemical bath is used to strip away the removable mask. As in each of the embodiments described above, the microscreen element is installed into the gas separation units with the permselective layer facing the gaseous feed mixture.

Incorporation by Reference

All patents, published patent applications and other references disclosed herein are hereby expressly incorporated in their entireties by reference.

It will also be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment, and for particular applications, e.g., for gas separation, those skilled in the art will recognize that its usefulness is not limited thereto and that the subject technology can be beneficially utilized in any number of environments and implementations. Accordingly, the claims set forth below should be construed in view of the full breadth and spirit of the invention as disclosed herein.

What is claimed is:

1. A separation unit for separating a permeate gas from a pressurized feed mixture comprising:
a support frame comprising a substantially continuous perimeter wall entirely surrounding a hollow cavity, wherein the support frame includes a top frame surface;
a first microscreen element comprising a substantially non-porous material formed with substantially parallel and opposing first top and first bottom microscreen surfaces and further formed with a substantially continuous first non-porous perimeter wall entirely surrounding a first porous central area that includes a plurality of fluid passages extending from the first top microscreen surface to the first bottom microscreen surface wherein the first bottom microscreen surface is supported with the first non-porous perimeter wall portion in mating contact with the top frame surface and with the first porous central area extending over at least a portion of the hollow cavity, and the first top microscreen surface is substantially planar;

a first permselective membrane comprising a permselective material formed with substantially parallel and opposed first top and first bottom membrane surfaces supported with the first bottom membrane surface in mating contact with the first top microscreen surface, wherein the first permselective membrane is disposed over the entire porous central area; and, a porous spacer, disposed in the hollow cavity, comprising a structural material disposed to structurally support the first bottom microscreen surface wherein the porous spacer is further configured with a first void volume in fluid communication with the first porous central area for receiving fluid passing through the first porous central area and for conveying the fluid through the hollow cavity.

2. The separation unit of claim 1 further comprising a first chamber for receiving and containing the pressurized feed mixture therein, wherein the first chamber is opposed to the hollow cavity and separated from the hollow cavity by a first membrane assembly formed by the first permselective membrane, positioned to face the first chamber, and the first microscreen element positioned to face the hollow cavity.

3. The separation unit of claim 2 wherein the permeate gas is hydrogen gas.

4. The separation unit of claim 1 wherein the permselective membrane is a foil comprising palladium with a foil thickness ranging from 0.00008 inches to 0.005 inches.

5. The separation unit of claim 1 wherein the permselective membrane is an alloy of palladium.

6. The separation unit of claim 1 wherein the first microscreen element comprises a metal sheet with a sheet thickness ranging from 0.001 inches to 0.020 inches.

7. The separation unit of claim 6 wherein the metal sheet comprises 304 series or 316 series stainless steel with a sheet thickness ranging from 0.001 inches to 0.020 inches.

8. The separation unit of claim 1 wherein the plurality of fluid passages are circular through holes each having a hole diameter ranging from 0.003 inches to 0.020 inches.

9. The separation unit of claim 8 wherein the circular through holes are disposed in a uniform pattern with a hole center to center spacing ranging from 0.005 inches to 0.025 inches.

10. The separation unit of claim 1 wherein the porous spacer comprises metal wire strands woven together with a mesh spacing wherein the mesh spacing is sufficient for providing the void volume and further wherein the porous spacer is formed to substantially fill the hollow cavity.

11. The separation unit of claim 1 wherein the porous spacer comprises a substantially non-porous solid element formed to substantially fill the hollow cavity and further formed with a pattern of surface grooves extending over a top surface thereof for providing the void volume wherein material lands formed between the surface grooves are disposed in mating contact with the first bottom microscreen surface.

12. The separation unit of claim 2 further comprising:
a feed mixture input port associated with the first chamber for delivering the pressurized feed mixture into the first chamber;
a feed mixture output port associated with the first chamber for delivering the pressurized feed mixture out of the first chamber; and,
a permeate output port associated with the hollow cavity for delivering the permeate out of the hollow cavity.

13. The separation unit of claim 1 wherein the support frame includes a bottom frame surface opposed to and substantially parallel with the top frame surface and separated from the top frame surface by a frame thickness further comprising:
a second microscreen element comprising a substantially non-porous material formed with substantially parallel and opposing second top and second bottom microscreen surfaces and further formed with a substantially continuous second non-porous perimeter wall entirely surrounding a second porous central area that includes a plurality of fluid passages extending from the second top microscreen surface to the second bottom microscreen surface wherein the second top microscreen surface is supported with the second non-porous perimeter wall portion in mating contact with the bottom frame surface and with the second porous central area extending over at least a portion of the hollow cavity substantially opposed to the first porous central area;
a second permselective membrane comprising a permselective material formed with substantially parallel and opposed second top and first bottom membrane surfaces supported with the second top membrane surface in mating contact with the second bottom microscreen surface, wherein the second permselective membrane is disposed over the entire second porous central area; and,
wherein the porous spacer is further configured to structurally support the second top microscreen surface and to provide a second void volume in fluid communication with the second porous central area for receiving fluid passing through the second porous central area and conveying the fluid through the hollow cavity.

14. The separation unit of claim 13 wherein the porous spacer comprises metal wire strands woven together with a mesh spacing wherein the mesh spacing is sufficient for providing each of the first and second void volumes and further wherein the porous spacer is formed to substantially fill the hollow cavity.

15. The gas separation unit of claim 13 wherein the porous spacer comprises a spacer assembly having a thickness substantially equal to the frame thickness comprising:
a top porous spacer comprising woven metal wire strands formed to substantially fill a top portion of the hollow cavity for structurally supporting the first bottom microscreen surface and for providing the first void volume;
a bottom porous spacer comprising woven metal wire strands formed to substantially fill a bottom portion of the hollow cavity for structurally supporting the second top microscreen surface and providing the second void volume; and,
a non-porous spacer shim disposed between the top porous spacer and the bottom porous spacer.

16. The separation unit of claim 13 wherein the porous spacer comprises a substantially non-porous solid element having a spacer top surface for structurally supporting the first bottom microscreen surface and a substantially parallel and opposing spacer bottom surface for structurally supporting the second top microscreen surface wherein a first pattern of surface grooves extends over the spacer top surface for providing the first void volume and a second pattern of surface grooves extends over the spacer bottom surface for providing the second void volume and wherein the porous spacer substantially fills the hollow cavity.

17. The separation unit of claim 15 wherein the pressurized feed mixture comprises a gaseous mixture that includes hydrogen gas to be separated out there from and further wherein each of the first and second permselective membranes comprises a foil comprising palladium with a foil thickness in the range of 0.00008 inches to 0.005 inches.

18. The separation unit of claim 13 wherein each of the first and second microscreen elements is substantially identical and comprises a sheet of 304 series or 316 series stainless steel having a thickness in the range of 0.001 inches to 0.010 inches.

19. The separation unit of claim 13 further comprising:
a second chamber for receiving and containing the pressurized feed mixture therein, wherein the second chamber is opposed to the hollow cavity and separated from the hollow cavity by a second membrane assembly formed by the second permselective membrane, positioned to face the second chamber, and the second microscreen element positioned to face the hollow cavity; and,
a fluid conduit disposed to interconnect the first and second chamber.

20. The separation unit of claim 19 further comprising:
a feed mixture input port associated with the first chamber for delivering the pressurized feed mixture into the first chamber;
a feed mixture output port associated with the second chamber for delivering the pressurized feed mixture out of the second chamber; and,
a permeate output port associated with the hollow cavity for delivering the permeate out of the hollow cavity.

21. The separation unit of claim 13 formed with a substantially circular cross-section wherein the support frame comprises a circular outer portion entirely surrounding an annular shaped hollow cavity and a circular inner portion each entirely surrounded by the annular shaped hollow cavity wherein each of the first and second microscreen elements is substantially identical and comprises a sheet of 304 series or 316 series stainless steel having a thickness in the range of 0.001 inches to 0.010 inches with each of the first and second microscreen elements being formed with an annular shape having a microscreen outside diameter and first circular through hole centered with respect to the outside diameter defining a microscreen inside diameter, wherein the microscreen includes a non-porous circular outer perimeter wall proximate to the outside diameter and supported on the circular outer portion, a non-porous circular inner perimeter wall proximate to the inside diameter and supported on the circular inner portion, and wherein the porous central area has an annular shape and is disposed between the circular outer perimeter wall and the circular inner perimeter wall; and,
wherein each of the first and second permselective membranes is substantially identical and comprises a foil comprising palladium with a foil thickness in the range of 0.00008 inches to 0.005 inches and is formed with a membrane outside diameter sized to substantially match the microscreen outside diameter and with a membrane inside diameter sized to substantially match the microscreen inside diameter.

22. The separation unit of claim 13 formed with a substantially rectangular cross section with a rectangular support frame perimeter wall surrounding a rectangular through hole forming a rectangular hollow cavity, wherein each of the first and second microscreen elements is substantially identical comprising a sheet of 304 series or 316 series stainless steel having a thickness in the range of 0.001 inches to 0.010 inches formed with a non-porous rectangular perimeter wall surrounding a porous rectangular central area with each microscreen element disposed with the non-porous rectangular perimeter wall supported on the rectangular support frame perimeter wall and with the porous rectangular central area disposed over the rectangular hollow cavity on opposing top and bottom surfaces of the rectangular support frame; and,
wherein each of the first and second permselective membranes is substantially identical and comprises a rectangular shaped foil sized to exceed the rectangular dimensions of the rectangular hollow cavity wherein the foil comprises palladium with a foil thickness in the range of 0.00008 inches to 0.005 inches.

23. A permeate assembly for separating a permeate gas from a pressurized feed mixture comprising:
a support frame having a frame perimeter that defines a central aperture;
a porous spacer in the central aperture;
a microscreen element having a first surface compressed against the support frame and the porous spacer and a second planar surface opposing the first surface, the microscreen element having a non-porous perimeter in mating contact with the frame perimeter and defining a plurality of transverse passages from the second surface to the first surface, the transverse passages being in fluid communication with the porous spacer; and
a permselective membrane compressed against the second planar surface of the microscreen element such that when the pressurized feed mixture is urged against the permselective membrane, permeate gas is forced to pass through the permselective membrane and the planar microscreen element into the porous spacer.

24. A permeate assembly as recited in claim 23, wherein the transverse passages are formed by a semiconductor manufacturing process.

* * * * *